(12) United States Patent
Kishikawa et al.

(10) Patent No.: US 12,537,831 B2
(45) Date of Patent: Jan. 27, 2026

(54) THREAT INFORMATION DEPLOYING SYSTEM, THREAT INFORMATION DEPLOYING METHOD, AND RECORDING MEDIUM

(71) Applicant: Panasonic Intellectual Property Corporation of America, Torrance, CA (US)

(72) Inventors: Takeshi Kishikawa, Osaka (JP); Takamitsu Sasaki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 93 days.

(21) Appl. No.: 18/733,358

(22) Filed: Jun. 4, 2024

(65) Prior Publication Data

US 2024/0323205 A1    Sep. 26, 2024

Related U.S. Application Data

(63) Continuation of application No. PCT/JP2022/039713, filed on Oct. 25, 2022.

(30) Foreign Application Priority Data

Dec. 17, 2021    (JP) .................. 2021-204929

(51) Int. Cl.
*H04L 9/40*    (2022.01)

(52) U.S. Cl.
CPC ...... *H04L 63/1416* (2013.01); *H04L 63/1433* (2013.01)

(58) Field of Classification Search
None
See application file for complete search history.

(56) References Cited

U.S. PATENT DOCUMENTS

| | | | |
|---|---|---|---|
| 2021/0019405 A1* | 1/2021 | Kawaguchi | G06F 21/577 |
| 2021/0344700 A1* | 11/2021 | Ueno | G06F 21/552 |
| 2021/0352088 A1* | 11/2021 | Adams | G06F 21/44 |
| 2022/0191238 A1* | 6/2022 | Mascarenhas | G06F 11/1464 |

FOREIGN PATENT DOCUMENTS

| | | |
|---|---|---|
| EP | 3 868 617 | 8/2021 |
| JP | 2019-191657 | 10/2019 |
| JP | 6710716 | 6/2020 |

OTHER PUBLICATIONS

International Search Report issued in International Pat. Appl. No. PCT/JP2022/039713, dated Dec. 13, 2022.
Extended European Search Report for App. No. EP 22907027.1, dated Mar. 10, 2025.

* cited by examiner

*Primary Examiner* — J. Brant Murphy
*Assistant Examiner* — Hassan Saadoun
(74) *Attorney, Agent, or Firm* — GREENBLUM & BERNSTEIN, P.L.C.

(57) ABSTRACT

A monitoring server of an in-vehicle control network system includes a threat information generator that obtains first threat information pertaining to a threat that has occurred in a vehicle of a first vehicle type, a threat information abstractor that generates abstracted threat information by deleting information specific to the first vehicle type from the first threat information, and a display that outputs second threat information generated based on the abstracted threat information and including a risk value indicating a risk level of the threat to a second vehicle type different from the first vehicle type.

11 Claims, 19 Drawing Sheets

| Time received (ms) | ID | Payload (Hexadecimal) |
|---|---|---|
| 10000 | 0x100 | 11 22 33 44 55 66 77 88 |
| 10001 | 0x200 | 00 00 00 00 |
| 10004 | 0x300 | 00 FF 00 FF 33 22 11 |
| 10007 | 0x500 | 12 34 |
| ... | ... | ... |

FIG. 7

| Anomaly ID | Time detected | Payload (Hexadecimal) | Contents of detected anomaly |
|---|---|---|---|
| 0x200 | 10012 | FF FF FF FF | Anomalous communication amount Anomalous payload value |
| 0x200 | 10022 | FF FF FF FF | Anomalous communication amount Anomalous payload value |
| 0x200 | 10032 | FF FF FF FF | Anomalous communication amount Anomalous payload value |

FIG. 8

| Vehicle being monitored | Time received (ms) | ID | Payload (Hexadecimal) |
|---|---|---|---|
| 10a | 10000 | 0x100 | 11 22 33 44 55 66 77 88 |
| | 10001 | 0x200 | 00 00 00 00 |
| | 10004 | 0x300 | 00 FF 00 FF 33 22 11 |
| | ... | ... | ... |
| ... | | | |

FIG. 9

| Vehicle being monitored | Contents of alert | ID | Time message received | Payload (Hexadecimal) |
|---|---|---|---|---|
| 10a | Anomalous communication amount Anomalous payload value | 0x200 | 10012 | FF FF FF FF |
| | Anomalous communication amount Anomalous payload value | 0x200 | 10022 | FF FF FF FF |
| | Anomalous communication amount Anomalous payload value | 0x200 | 10032 | FF FF FF FF |
| ... | ... | ... | ... | ... |

FIG. 10

| Threat information ID | Contents |
|---|---|
| TID-001 | Target vehicle type: A<br>Influence:Unauthorized brake control<br>Name of anomalous signal: Emergency brake request signal<br>ID of anomalous message: 0x200<br>Signal value: 0x3 (Sudden brake ON)<br>Amount of increase in anomalous message: 50%<br>Number of instances observed for each vehicle: {A001: 100, A008: 20}<br>Attack deployability: Medium |
| TID-002 | ... |

FIG. 11

| Vehicle type | Type of specific information | Value |
|---|---|---|
| A | Signal and transmitting and receiving ECU | {Emergency brake request signal: Brake ECU_A}, ... |
| | Signal processing condition of ECU | {Emergency brake request signal: Speed < 40km/h}, ... |
| | Signal communication network | {Emergency brake request signal: Chassis},<br>{Speed: Chassis, Powertrain}, ... |
| | Network configuration | {Chassis: Powertrain}, ... |
| C | Signal and transmitting and receiving ECU | {Emergency brake request signal: Brake ECU_C}, ... |
| | Signal processing condition of ECU | {Emergency brake request signal: None}, ... |
| | Signal communication network | {Emergency brake request signal: ADAS}, ... |
| | Network configuration | {Chassis: ADAS}, ... |
| ... | | |

FIG. 12

| Threat information ID | Contents |
|---|---|
| TID-001 | Influence: Unauthorized brake control<br>Name of anomalous signal: Emergency brake request signal<br>Signal value: Sudden brake ON<br>Amount of increase in anomalous message: 50%<br>Attack deployability: Medium |
| TID-002 | ... |

FIG. 16

| Vehicle suitability | | Ease of target NW access | | |
|---|---|---|---|---|
| Attack deployability | Ease of attack success | High | Medium | Low |
| High | High | High | Medium | Low |
| High | Medium | High | High | High |
| High | Low | High | High | Medium |
| Medium | High | High | Medium | Low |
| Medium | Medium | High | High | Medium |
| Medium | Low | Medium | Low | Low |
| Low | High | Medium | Medium | Low |
| Low | Medium | Medium | Low | Low |
| Low | Low | Low | Low | Low |

THREAT INFORMATION DEPLOYING SYSTEM, THREAT INFORMATION DEPLOYING METHOD, AND RECORDING MEDIUM

CROSS REFERENCE TO RELATED APPLICATIONS

This is a continuation application of PCT International Application No. PCT/JP2022/039713 filed on Oct. 25, 2022, designating the United States of America, which is based on and claims priority of Japanese Patent Application No. 2021-204929 filed on Dec. 17, 2021. The entire disclosures of the above-identified applications, including the specifications, drawings and claims are incorporated herein by reference in their entirety.

FIELD

The present disclosure relates to a threat information deploying system, a threat information deploying method, and a recording medium for an in-vehicle control network system.

BACKGROUND

Among systems in which all kinds of devices are connected, such as systems called Internet of Things (IoT) or Cyber Physical System (CPS), increasing in recent years are systems that process, in cyberspace, sensing results obtained in a physical space and control the physical space. Along with such a trend, the importance of cybersecurity technology is increasingly advocated.

Some incidents have actually occurred in which a security problem in a control system network of an automobile or a factory has led to unauthorized control of the automobile or shutdown of the factory. Thus, security problems have an impact on human lives or business continuity.

In Internet Technology (IT) systems, threat information is utilized in order to promptly respond to constantly evolving methods of attack.

Threat information, also called threat intelligence or cyber threat intelligence (CTI), is a knowledge base containing information on attackers or specific means of attack.

Threat information includes, for example, information about illegal IP addresses or hash values of malware, and the use of such information makes it possible to catch a sign of an attack and to take an appropriate measure. Using such threat information widely can lead to improved security at a greater number of organizations or systems, and such improvement brings benefit to the society as a whole. For this purpose, Information Sharing and Analysis Center (ISAC) exists as an organization that collects and shares threat information.

In the field of automobiles, Auto-ISAC has been established, and ISACs for various industries are expected to be established henceforth.

Incidentally, threat information can be used widely for systems such as IT systems which include devices provided with standard communication protocols and widely used operating systems. Meanwhile, for systems such as automotive systems which have communication protocols specific to auto manufacturers or vehicle types or for systems that include dedicated electronic control units (ECUs), threat information that is valid for a specific vehicle type cannot be applied to another vehicle type without any modification, and it may be difficult to accumulate threat information for each vehicle type.

Furthermore, sharing of threat information specific to a certain system may allow the vehicle type or the manufacturer targeted by the attack to be identified and reveal vulnerabilities of the automotive system. Therefore, sharing of threat information may not proceed as desired.

In consideration of such circumstances, Patent Literature (PTL) 1 discloses a system for sharing threat information between a plurality of organizations. Specifically, PTL 1 discloses a technique for evaluating the usefulness of threat information based on the novelty or the degree of influence of the threat information.

Meanwhile, PTL 2 discloses a threat information evaluation device that assists a security manager in evaluating threat information.

CITATION LIST

Patent Literature

PTL 1: Japanese Unexamined Patent Application Publication No. 2019-191657
PTL 2: Japanese Patent No. 6710716

SUMMARY

Technical Problem

PTL 1 described above, however, lacks any specific disclosure as to a method of determining the extent to which threat information is useful for the host system or whether the threat requires an urgent response.

PTL 2 described above lacks any specific disclosure as to the method of evaluating threat information other than that machine learning is used on the patterns of threat information and the evaluation values by the security manager.

The present disclosure provides a threat information deploying system and so forth that, when deploying threat information to another vehicle type, can evaluate the usefulness of the threat information for the vehicle type to which the threat information is deployed.

Solution to Problem

A threat information deploying system according to one aspect of the present disclosure is a threat information deploying system in an in-vehicle control network system, and the threat information deploying system includes: an obtainer that obtains first threat information pertaining to a threat that has occurred in a vehicle of a first vehicle type; a threat information abstractor that generates abstracted threat information by deleting information specific to the first vehicle type from the first threat information; and an outputter that outputs second threat information generated based on the abstracted threat information and including a risk value indicating a risk level of the threat to a second vehicle type different from the first vehicle type.

Advantageous Effects

The threat information deploying system and so forth according to one aspect of the present disclosure makes it possible to, when deploying threat information to another vehicle type, evaluate the usefulness of the threat information for the vehicle type to which the threat information is deployed.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 7 is a diagram showing one example of an anomaly detection log according to Embodiment 1.

FIG. 8 is a diagram showing one example of a vehicle communication log according to Embodiment 1.

FIG. 9 is a diagram showing one example of an alert according to Embodiment 1.

FIG. 10 is a diagram showing one example of threat information according to Embodiment 1.

FIG. 11 is a diagram showing one example of vehicle type-specific information according to Embodiment 1.

FIG. 12 is a diagram showing one example of shared threat information according to Embodiment 1.

FIG. 16 is a diagram showing one example of a vehicle type suitability determination matrix according to Embodiment 1.

DESCRIPTION OF EMBODIMENTS

Figure 1:
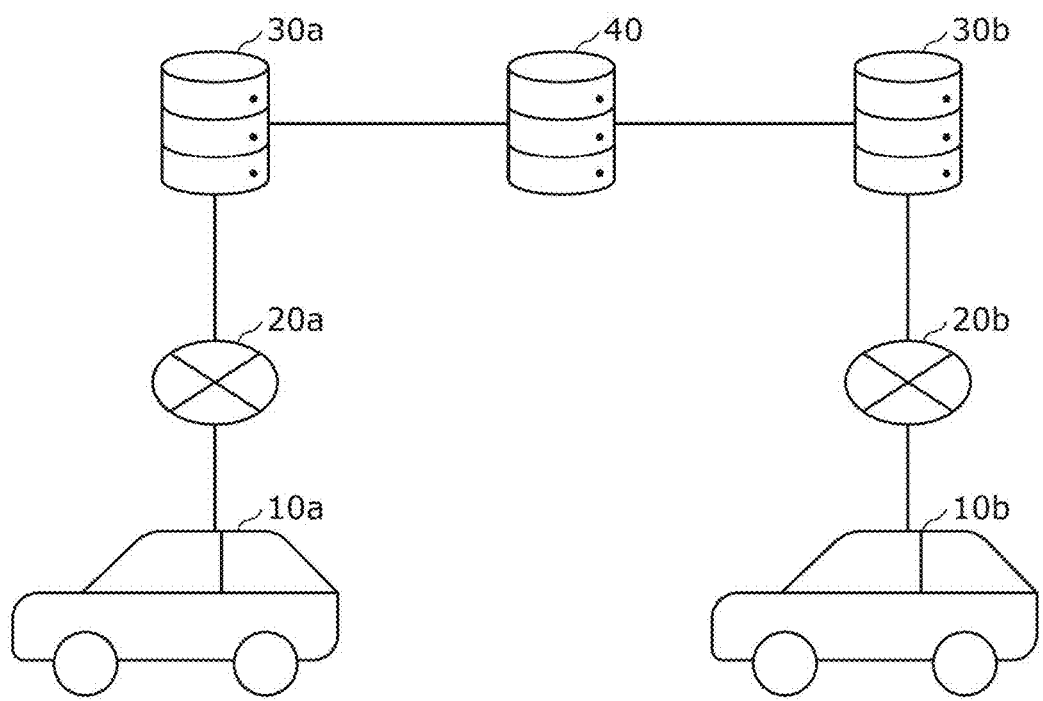
FIG. 1 is an overall configuration diagram of an automobile cybersecurity monitoring system according to Embodiment 1.

A threat information deploying device according to one aspect of the present disclosure is a threat information deploying system in an in-vehicle control network system, and the threat information deploying system includes an obtainer that obtains first threat information pertaining to a threat that has occurred in a vehicle of a first vehicle type, a threat information abstractor that generates abstracted threat information by deleting information specific to the first vehicle type from the first threat information, and an outputter that outputs second threat information generated based on the abstracted threat information and including a risk value indicating a risk level of the threat to a second vehicle type different from the first vehicle type.

With this configuration, the information specific to the first vehicle type is deleted when the threat information pertaining to the threat that has occurred in the first vehicle type is deployed to the second vehicle type different from the first vehicle type. Thus, the vehicle type or the manufacturer targeted in the attack can be kept from being identified, and the vulnerability of the automobile system can be kept from being revealed. Furthermore, the second threat information includes the risk value with regard to the second vehicle type. Thus, the threat information can be deployed with the risk level of the threat that may vary depending on the vehicle type taken into consideration. Accordingly, the usefulness of the threat information on the vehicle type to which the threat information is deployed can be evaluated when the threat information is deployed to another vehicle type. Thus, the threat information can be utilized effectively, which works advantageously in improving the security.

For example, the threat information deploying system may further include a risk value calculator that calculates the risk value.

In this manner, the threat information deploying system may calculate the risk value.

For example, the threat information deploying system may further include a threat occurrence status holder and an attack deployability determiner. The threat occurrence status holder may hold a threat occurrence status of each anomalous vehicle in which the threat corresponding to the abstracted threat information has been observed. The attack deployability determiner may calculate deployability of the threat corresponding to the abstracted threat information, based on a total number of vehicle types of the anomalous vehicles or a total number of the anomalous vehicles indicated by the threat occurrence status. The risk value calculator may calculate the risk value based on the deployability.

The abstracted threat information corresponds to similar threats that may occur across different vehicle types (referred to as a similar threat). Any threat information pertaining to a similar threat is substantially the same information except for the information specific to each vehicle type, and as the information specific to the vehicle type is deleted from the threat information, any threat information may result in the same abstracted threat information. Accordingly, an instance of occurrence of a similar threat can be associated with one item of abstracted threat information. Furthermore, the deployability of the threat can be determined in accordance with the number of vehicle types or the number of vehicles in which a similar threat has occurred, and information useful in the utilization of the abstracted threat information can be provided.

For example, the threat information deploying system may further include a vehicle type-specific information holder and a vehicle type suitability determiner. The vehicle type-specific information holder may hold, for each vehicle type, vehicle type-specific information including at least one of information pertaining to an electronic control device provided, a signal that the electronic control device receives, a network over which the signal that the electronic control device receives is communicated, and configuration information of an in-vehicle network. The vehicle type suitability determiner may calculate suitability of the abstracted threat information to the second vehicle type with use of the abstracted threat information and the vehicle type-specific information pertaining to the second vehicle type. The risk value calculator may calculate the risk value based on the suitability.

Since the electronic control device affected by a threat, the signal that that electronic control device receives, the network over which that signal is communicated, or the in-vehicle network may vary between vehicle types, the suitability of the abstracted threat information can be determined based on the vehicle type-specific information specific to the second vehicle type, and the suitability of the abstracted threat information to the second vehicle type can be evaluated.

For example, the information pertaining to the electronic control device may include an operation condition for processing a signal received by the electronic control device. The vehicle type suitability determiner may calculate the suitability with use of ease of an attack succeeding on the second vehicle type, the ease being determined based on at least one of whether the operation condition for processing the signal that has caused the threat corresponding to the abstracted threat information includes a condition pertaining to a signal outside the in-vehicle network of a vehicle of the second vehicle type, whether there are a predetermined number or more of operation conditions each being the operation condition, or whether an anti-tamper measure or access control is set on the signal that the electronic control device receives.

Since the operation condition and so forth for the electronic control device provided in the vehicle to process the signal that has caused the threat may vary between vehicle types, as the ease of attack on the second vehicle type is evaluated based on the complexity and so forth of such an operation condition, the suitability of the abstracted threat information to the second vehicle type can be evaluated with high accuracy.

For example, the vehicle type suitability determiner may calculate the suitability with use of ease of access to a communication network in a vehicle of the second vehicle type, the ease of access being determined based on a total number of subnetworks routed from, among electronic control devices provided in a vehicle of the second vehicle type, an external connection device connected to a network outside the vehicle to the communication network over which the signal that has caused the threat corresponding to the abstracted threat information is communicated.

Since the number of subnetworks to be routed from the external connection device to the communication network over which the signal that has caused the threat is communicated may vary between vehicle types, by evaluating the ease of access to the communication network necessary for the attacker to insert the signal, the suitability of the abstracted threat information to the second vehicle type can be evaluated with high accuracy.

For example, the outputter may output the second threat information when the suitability is greater than or equal to a predetermined value.

With this configuration, the increase in the threat information can be suppressed as the second threat information is not generated for a vehicle type with a low suitability of the abstracted threat information, and thus the storage capacity can be reduced.

For example, the threat information deploying system may further include a vehicle type-specific information holder and a vehicle log collector. The vehicle type-specific information holder may hold, for each vehicle type, information pertaining to an electronic control device provided, the information including an operation condition for processing a signal received by the electronic control device. The vehicle log collector may collect a vehicle log of a vehicle of the second vehicle type. The risk value calculator may calculate the risk value with regard to the vehicle based on a degree of match between the operation condition for processing the signal that has caused the threat corresponding to the abstracted threat information and a state of the vehicle included in the vehicle log.

With this configuration, the risk of the threat information can be evaluated individually for each vehicle in accordance with the vehicle state, and thus the entity to which the threat information is deployed can be set more dynamically.

For example, the threat information deploying system may further include a risk handler. The risk handler may determine a response to the threat to the second vehicle type based on the risk value. The response may be at least one of performing a process of matching an anomalous communication pattern indicated by the second threat information and a communication log collected from the vehicle of the second vehicle type, updating firmware of the electronic control device provided in the vehicle, limiting a function of the vehicle, or sending an alert to a security analyst.

With this configuration, the response corresponding to the risk value calculated for each vehicle can be determined, and the response can be carried out with a priority on the vehicle with a high risk value.

A threat information deploying method according to one aspect of the present disclosure is a method to be executed by a threat information deploying system in an in-vehicle control network system, and the threat information deploying method includes obtaining first threat information pertaining to a threat that has occurred in a vehicle of a first vehicle type, generating abstracted threat information by deleting information specific to the first vehicle type from the first threat information, and outputting second threat information generated based on the abstracted threat information and including a risk value indicating a risk level of the threat to a second vehicle type different from the first vehicle type.

The aspect above can provide a threat information deploying method that, when deploying threat information to another vehicle type, can evaluate the usefulness of the threat information for the vehicle type to which the threat information is deployed.

A recording medium according to one aspect of the present disclosure is a non-transitory computer-readable recording medium having recorded thereon a program for causing a threat information deploying system to execute the threat information deploying method above.

The aspect above can provide a recording medium that, when deploying threat information to another vehicle type, can evaluate the usefulness of the threat information for the vehicle type to which the threat information is deployed.

Hereinafter, a threat information deploying method according to an embodiment of the present disclosure will be described with reference to the drawings. It is to be noted that embodiments described below merely illustrate some specific, preferable examples of the present disclosure. In other words, the numerical values, the shapes, the materials, the constituent elements, the arrangements and the connection modes of the constituent elements, the steps, the orders of the steps, and so forth illustrated in the following embodiments are examples of the present disclosure and are not intended to limit the present disclosure. The present disclosure is specified based on the claims. Therefore, among the constituent elements in the following embodiments, any constituent elements that are not cited in the independent claims expressing the broadest concept of the present disclosure are not necessarily required in order to solve the problem faced by the present disclosure, but are to be construed as constituent elements constituting a more preferable embodiment.

Embodiment 1

Hereinafter, a threat information deploying system in an automobile cybersecurity monitoring system (also referred to as a vehicle control network system) that monitors the security state of a plurality of automobiles will be described.

1.1 Overall Configuration of Automobile Cybersecurity Monitoring System

FIG. 1 is an overall configuration diagram of an automobile cybersecurity system according to the present embodiment. The automobile cybersecurity system includes a threat information deploying system, and the threat information deploying system includes, for example but not limited to, an obtainer, a threat information abstractor, an outputter, a risk value calculator, a threat occurrence status holder, an attack deployability determiner, a vehicle type-specific information holder, a vehicle type suitability determiner, a vehicle log collector, and a risk handler. The threat information deploying system is a computer that includes, for example but not limited to, a processor, a communication interface, a user interface, and a memory. The memory includes, for example but not limited to, a read only memory (ROM) and a random access memory (RAM) and can store a program to be executed by the processor. The obtainer, the threat information abstractor, the risk value calculator, the attack deployability determiner, the vehicle type suitability determiner, and the risk handler are implemented by, for example but not limited to, the processor that executes a program or programs stored in the memory. The threat occurrence status holder and the vehicle type-specific information holder are implemented by, for example but not limited to, the memory. Herein, the memory that stores a program or programs, the threat occurrence status holder, and the vehicle type-specific information holder may each be a separate memory. The threat information deploying system may be, for example, a threat information deploying device contained in a single housing. Alternatively, the threat information deploying system may be a system whose constituent elements are distributed over a plurality of devices.

As shown in FIG. 1, the automobile cybersecurity monitoring system includes vehicle 10a, vehicle 10b, network 20a, network 20b, monitoring server 30a, monitoring server 30b, and threat information sharing server 40.

Vehicle 10a and vehicle 10b are vehicles that are each operated by a driver or by an autonomous driving system and that travel on a road. Vehicle 10a and vehicle 10b are vehicles of different years, of different models, with different options, or of different manufacturers. In other words, vehicle 10a and vehicle 10b are vehicles of different vehicle types. Vehicle 10a sends a security anomaly alert of the vehicle or a vehicle log to monitoring server 30a via network 20a. Vehicle 10a is one example of a vehicle of a first vehicle type, and vehicle 10b is one example of a vehicle of a second vehicle type different from the first vehicle type.

Network 20a is a communication network that connects vehicle 10a and monitoring server 30a and is implemented by a dedicated circuit or by the internet. Likewise, network 20b is a communication network that connects vehicle 10b and monitoring server 30b.

Monitoring server 30a detects a security incident of vehicle 10a based on a security anomaly alert or a vehicle log sent from vehicle 10a.

In addition, monitoring server 30a holds threat information and, based on the threat information, checks whether a vehicle log indicates that a vehicle is facing a threat. In one example case, threat information may be information having registered therein a result of an analysis performed by a security analyst based on a security alert of a vehicle or a vehicle log. In another example case, threat information may be information obtained by downloading threat information (abstracted threat information described later) registered in threat information sharing server 40 and by adapting the downloaded threat information to a vehicle type being monitored.

Furthermore, monitoring server 30a registers, into threat information sharing server 40, abstracted threat information abstracted by removing vulnerability information specific to the vehicle type from newly registered threat information.

Monitoring server 30b has a configuration similar to the configuration of monitoring server 30a, and thus the description of monitoring server 30b will be omitted.

For example, monitoring server 30a (monitoring server 30b) is one example of the threat information deploying system.

Herein, FIG. 1 shows an example in which monitoring server 30a monitors only vehicle 10a. Additionally, monitoring server 30a may also monitor a large number of other vehicles. A vehicle or vehicles that monitoring server 30a monitors may be of a vehicle type the same as that of vehicle 10a or of a vehicle type or vehicle types different from that of vehicle 10a. The vehicle that monitoring server 30a monitors may vary depending on the security vendor that manages monitoring server 30a, on the manufacturer of the vehicle to be monitored, or on the area in which the vehicle is monitored.

Threat information sharing server 40 is a sharing server for sharing threat information held by different organizations, such as a security vendor, an auto manufacturer, or a supplier. For example, threat information that monitoring server 30a holds pertaining to a threat that has occurred in vehicle 10a is shared, via threat information sharing server 40, with monitoring server 30b that is not monitoring vehicle 10a, and such sharing of threat information can help improve the security of vehicle 10b that monitoring server 30b monitors. Threat information sharing server 40 is managed by a trusted organization.

Herein, only an authenticated user or organization may be allowed to share threat information, and threat information sharing server 40 may play a role in authenticating or authorizing monitoring server 30a or 30b or an accessing entity.

1.2 Configuration of In-Vehicle Network System

Figure 2:
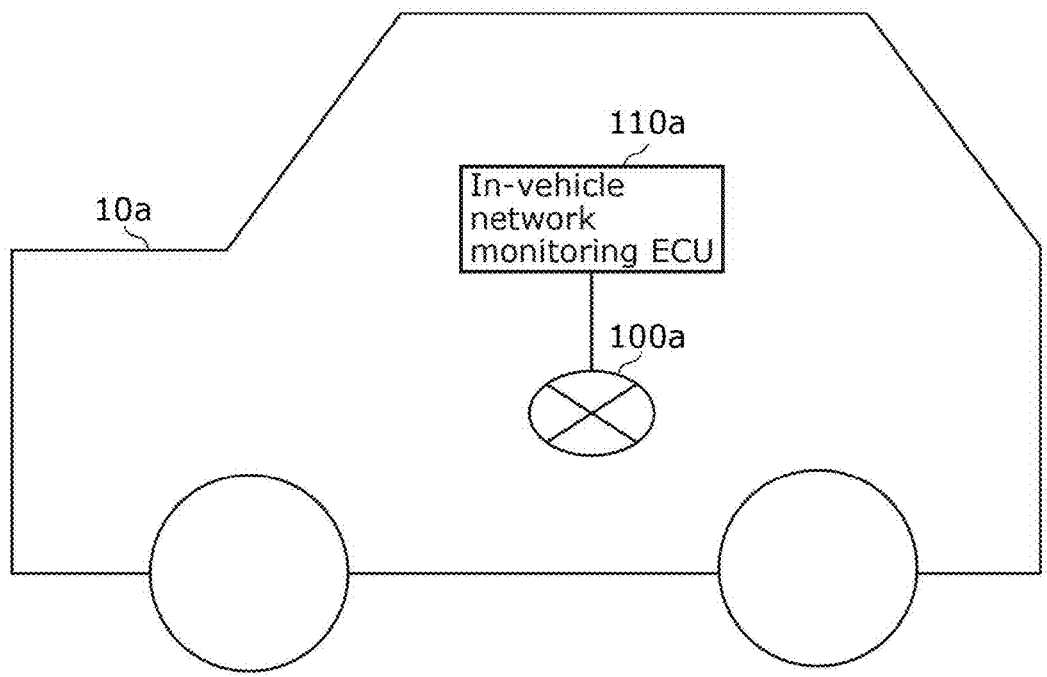
FIG. 2 is a configuration diagram of an in-vehicle network system according to Embodiment 1.

FIG. 2 is a configuration diagram of an in-vehicle network system of vehicle 10a according to the present embodiment. The in-vehicle network system of vehicle 10b has a configuration similar to the configuration of the in-vehicle network system of vehicle 10a, and thus the description of the in-vehicle network system of vehicle 10b will be omitted.

As shown in FIG. 2, the in-vehicle network system of vehicle 10a includes in-vehicle network 100a and in-vehicle network monitoring ECU 110a.

In-vehicle network 100a is a network in which a plurality of electronic control units (ECUs) are connected and may be constituted by a plurality of subnetworks.

The ECUs and the subnetworks constituting in-vehicle network 100a vary depending on the vehicle type, and the communication protocol or the meaning of the payload included in a message sent over in-vehicle network 100a also vary depending on the vehicle type.

An ECU communicates with another ECU, for example, in accordance with a communication standard, such as the controller area network (CAN), FlexRay (registered trademark), Ethernet (registered trademark), local interconnected network (LIN), or media oriented systems transport (MOST).

In-vehicle network monitoring ECU 110a is an ECU that monitors the communication carried out over in-vehicle network 100a. In-vehicle network monitoring ECU 110a obtains a log of communication and determines whether there is an anomaly in the communication.

Furthermore, in-vehicle network monitoring ECU 110a communicates with monitoring server 30a and, for example, sends a communication anomaly to monitoring server 30a as a security anomaly alert or sends a communication log to monitoring server 30a.

Herein, the ECU that sends an anomaly alert or a vehicle log to monitoring server 30a does not have to be implemented by in-vehicle network monitoring ECU 110a, and there may be another ECU that communicates with monitoring server 30a upon receiving a notification from in-vehicle network monitoring ECU 110a.

1.3 Configuration of In-Vehicle Network Monitoring ECU

Figure 3:
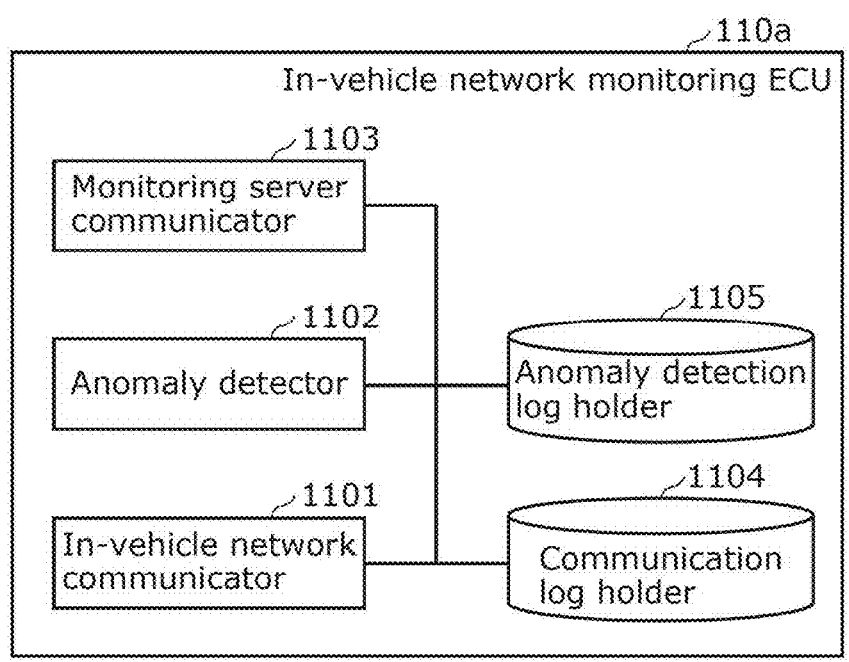
FIG. 3 is a configuration diagram of an in-vehicle network monitoring ECU according to Embodiment 1.

FIG. 3 is a configuration diagram of in-vehicle network monitoring ECU 110a according to the present embodiment.

As shown in FIG. 3, in-vehicle network monitoring ECU 110a includes in-vehicle network communicator 1101, anomaly detector 1102, monitoring server communicator 1103, communication log holder 1104, and anomaly detection log holder 1105.

In-vehicle network communicator 1101 is a communication interface that transmits and receives messages flowing over the in-vehicle network.

In-vehicle network communicator 1101 sends a received message to anomaly detector 1102 and also stores the received message into communication log holder 1104. Furthermore, in-vehicle network communicator 1101 transmits a message to in-vehicle network 100a in accordance with a message transmission request from anomaly detector 1102 or from monitoring server communicator 1103.

Anomaly detector 1102 monitors a message sent from in-vehicle network communicator 1101 and a communication log stored in communication log holder 1104 and determines whether any anomalous communication is occurring in in-vehicle network 100a.

If anomaly detector 1102 has detected an anomaly in the communication, anomaly detector 1102 sends a security anomaly alert and a corresponding communication log to monitoring server communicator 1103. In addition, anomaly detector 1102 stores the contents of the detected anomaly into anomaly detection log holder 1105. An anomaly in the communication is, for example, an anomalous communication amount, an anomalous payload value, an anomalous addressee or originator, or anomalous message authentication, but these are not limiting examples.

Monitoring server communicator 1103 is a communication interface with monitoring server 30a. In response to receiving a security anomaly alert from anomaly detector 1102, monitoring server communicator 1103, for example, sends an anomaly detection log stored in anomaly detection log holder 1105 to monitoring server 30a or sends a communication log stored in communication log holder 1104 to monitoring server 30a.

Communication log holder 1104 holds a log of messages sent over in-vehicle network 100a.

Anomaly detection log holder 1105 holds a log pertaining to anomalies in the communication detected by anomaly detector 1102.

1.4 Configuration of Monitoring Server

Figure 4:
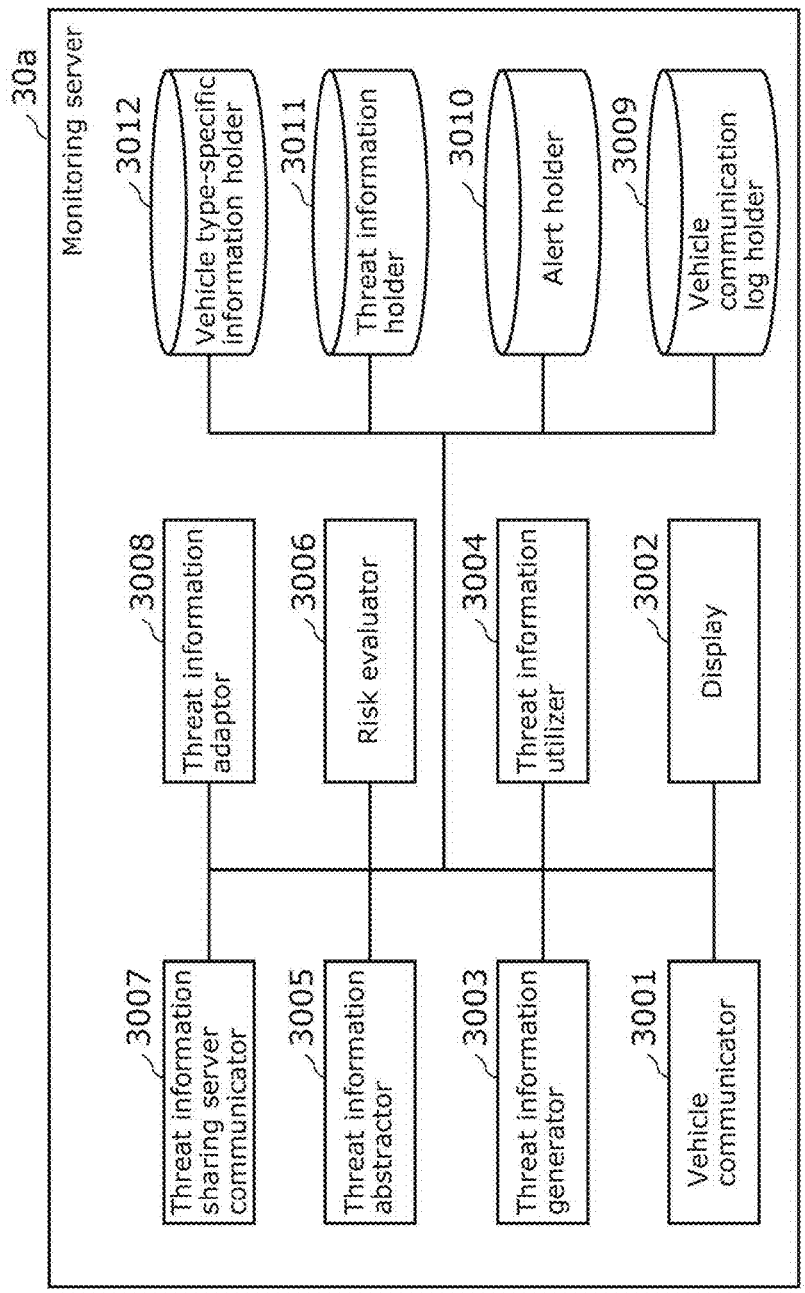
FIG. 4 is a configuration diagram of a monitoring server according to Embodiment 1.

FIG. 4 is a configuration diagram of monitoring server 30a according to the present embodiment. Monitoring server 30b has a configuration similar to the configuration of monitoring server 30a, and thus the description of monitoring server 30b will be omitted.

As shown in FIG. 4, monitoring server 30a includes vehicle communicator 3001, display 3002, threat information generator 3003, threat information utilizer 3004, threat information abstractor 3005, risk evaluator 3006, threat information sharing server communicator 3007, threat information adapter 3008, vehicle communication log holder 3009, alert holder 3010, threat information holder 3011, and vehicle type-specific information holder 3012.

Vehicle communicator 3001 is a communication interface for communicating with vehicle 10a via network 20a. Vehicle communicator 3001 receives, for example, a security anomaly alert or a vehicle log from vehicle 10a. Vehicle communicator 3001 is one example of a vehicle log collector. In the example described with reference to FIG. 17, vehicle communicator 3001 of monitoring server 30b collects a vehicle log of vehicle 10b of the second vehicle type.

Display 3002 is a display interface for a security analyst to check information pertaining to a security anomaly alert, a vehicle log, or threat information. Display 3002 is one example of an outputter that outputs second threat information that is generated based on abstracted threat information and that includes the risk value indicating the risk level of a threat to the second vehicle type different from the first vehicle type. FIG. 18, FIG. 19, FIG. 20, and FIG. 21 are display examples of display 3002, and these examples will be described later. Herein, the outputter is not limited to display 3002 and may instead be a constituent element that outputs second threat information, for example, to a memory included in monitoring server 30a or to another server.

Threat information generator 3003 extracts a specific method of attack as threat information based on a security alert stored in alert holder 3010 and stores the extracted threat information into threat information holder 3011.

Alternatively, threat information generator 3003 generates threat information from an input of a result analyzed by a security analyst and stores the generated threat information into threat information holder 3011.

Threat information generator 3003 is one example of an obtainer that obtains first threat information pertaining to a threat that has occurred in vehicle 10a of the first vehicle type. First threat information is threat information specific to the first vehicle type.

Threat information utilizer 3004 checks whether a vehicle communication log stored in vehicle communication log holder 3009a includes a threat that matches with threat information stored in threat information holder 3011. If such a threat is present, threat information utilizer 3004 responds by, for example, sending an alert to the vehicle that has transmitted the vehicle communication log. Threat information utilizer 3004 is one example of a risk handler that determines a response to a threat to the second vehicle type based on the risk value. In the example described with reference to FIG. 17, threat information utilizer 3004 of monitoring server 30b determines the response to the threat to the second vehicle type.

Threat information abstractor 3005 generates abstracted threat information from threat information specific to a vehicle by deleting information specific to the vehicle type. Specifically, threat information abstractor 3005 generates abstracted threat information from first threat information by deleting information specific to the first vehicle type.

Examples of information that can be deleted from threat information specific to a vehicle include information that may allow the vehicle type to be identified, examples of such information include an identifier included in a message and specific to the vehicle type, raw message information, the vehicle type concerned, or the number of received messages. Information that is not to be deleted from threat information specific to a vehicle includes information that does not play any role in identifying the vehicle type, and examples of such information include the role of the ECU targeted by the attack, the meaning of a signal value altered and the contents of the alteration, the rate of increase in the communication amount, or an influence produced by the attack.

Abstracted threat information corresponds to similar threats that may occur in different vehicle types (also referred to as similar threats). Threat information pertaining to similar threats is substantially the same across vehicle types except for the information specific to each vehicle type, and as the information specific to a vehicle type is deleted from threat information, any threat information may turn into the same abstracted threat information. Furthermore, when abstracting threat information, threat information abstractor 3005 determines the attack deployability of the abstracted threat information based on whether a threat corresponding to the abstracted threat information is occurring in a plurality of vehicle types or in a plurality of vehicles, and incorporates the determined attack deployability into the abstracted threat information. Threat information abstractor 3005 is one example of an attack deployability determiner that calculates the deployability of an attack corresponding to abstracted threat information in accordance with the number vehicle types of anomalous vehicles or the number of anomalous vehicles indicated by the occurrence status of the threat in each anomalous vehicle in which the threat corresponding to the abstracted threat information has been observed.

Threat information abstractor 3005 sends abstracted threat information to threat information sharing server communicator 3007 and to threat information sharing server 40.

Threat information abstractor 3005 may send abstracted threat information to threat information holder 3011, and threat information holder 3011 may store the abstracted threat information therein.

Risk evaluator 3006 determines the risk value of threat information stored in threat information holder 3011 based on vehicle type-specific information stored in vehicle type-specific information holder 3012 and the traveling state of the vehicle being monitored. Risk evaluator 3006 informs threat information utilizer 3004 of the response, in accordance with the combination of the vehicle and the threat information determined to have a high risk value. Risk evaluator 3006 is one example of a risk value calculator that calculates the risk value indicating the risk level of a threat to the second vehicle type different from the first vehicle type. In the example described with reference to FIG. 17, risk evaluator 3006 of monitoring server 30b calculates the risk value.

Threat information sharing server communicator 3007 is a communication interface with threat information sharing server 40.

Threat information sharing server communicator 3007 sends abstracted threat information stored in threat information holder 3011 to threat information sharing server 40, receives abstracted threat information from threat information sharing server 40, and stores the received abstracted threat information into threat information holder 3011.

Threat information adapter 3008 determines whether abstracted threat information received from threat information sharing server 40 can be adapted to the vehicle type that threat information adapter 3008 monitors. The suitability of the threat information is determined by the ECU that receives a signal of the altered signal value included in the threat information, with the use of vehicle type-specific information stored in vehicle type-specific information holder 3012 and based on the complexity of an operation condition for receiving and processing the signal or the ease of access to the network that receives the signal from a network outside the vehicle. Threat information adapter 3008 is one example of a vehicle type suitability determiner that calculates the suitability of abstracted threat information to the second vehicle type with the use of the abstracted threat information and the vehicle type-specific information pertaining to the second vehicle type. In the example described with reference to FIG. 15, threat information adapter 3008 of monitoring server 30b calculates the suitability of the abstracted threat information to the second vehicle type.

Vehicle communication log holder 3009 holds a communication log sent from vehicle 10a.

Alert holder 3010 holds an alert sent from vehicle 10a.

Threat information holder 3011 holds threat information including information pertaining to a threat that has occurred in the vehicle. Threat information holder 3011 is one example of a threat occurrence status holder that holds the occurrence status of a threat for each anomalous vehicle in which a threat corresponding to abstracted threat information has been observed.

Vehicle type-specific information holder 3012 holds information about ECUs included in a vehicle, the communication specifications, or the network architecture that each vary between vehicle types. For example, vehicle type-specific information holder 3012 holds, for each vehicle type, vehicle type-specific information that includes at least one of information pertaining to the ECUs provided in the vehicle, a signal that each ECU receives, a network used for communication of a signal that each ECU receives, or configuration information of the in-vehicle network. Furthermore, for example, vehicle type-specific information holder 3012 holds, for each vehicle type, information pertaining to each ECU which includes an operation condition for processing a signal that the ECU provided in the vehicle has received.

1.5 Configuration of Threat Information Sharing Server

Figures 5, 6:
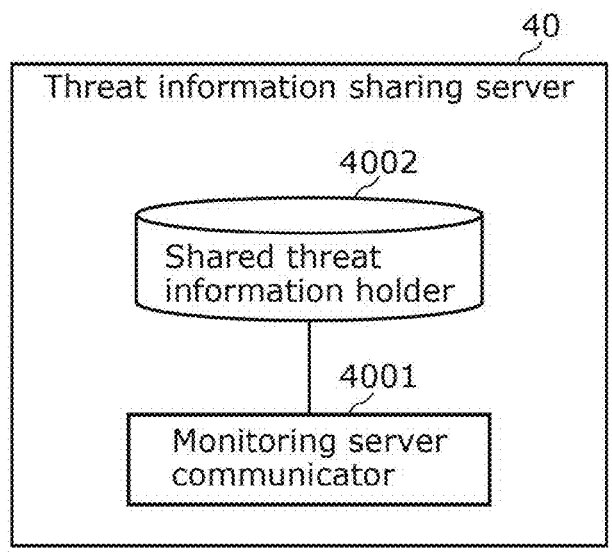
FIG. 5 is a configuration diagram of a threat information sharing server according to Embodiment 1.
FIG. 6 is a diagram showing one example of a communication log according to Embodiment 1.

FIG. 5 is a configuration diagram of threat information sharing server 40 according to the present embodiment.

As shown in FIG. 5, threat information sharing server 40 includes monitoring server communicator 4001 and shared threat information holder 4002.

Monitoring server communicator 4001 is an interface for sending and receiving abstracted threat information to and from monitoring server 30a or 30b. Monitoring server communicator 4001 stores abstracted threat information received from monitoring server 30a or 30b into shared threat information holder 4002. Furthermore, monitoring server communicator 4001 sends back abstracted threat information stored in shared threat information holder 4002 in response to an inquiry from monitoring server 30a or 30b.

Shared threat information holder 4002 holds abstracted threat information sent from monitoring server 30a or 30b.

1.6 One Example of Communication Log

FIG. 6 shows one example of a communication log according to the present embodiment. The communication log is stored in communication log holder 1104. In FIG. 6, the time received, the ID, and the payload of each message are illustrated as an example of a communication log observed in the in-vehicle network and held by communication log holder 1104.

FIG. 6 indicates that the time received of the message in the first row is 10000 (ms), that the message's ID is 0x100, and that its payload is "0x1122334455667788".

It is also indicated that the time received of the message in the second row is 10001 (ms), that the message's ID is 0x200, and that its payload is "0x00000000".

It is further indicated that the time received of the message in the third row is 10004 (ms), that the message's ID is 0x300, and that its payload is "0x00FF00FF332211".

It is further indicated that the time received of the message in the fourth row is 10007 (ms), that the message's ID is 0x500, and that its payload is "0x1234".

1.7 One Example of Anomaly Detection Log

FIG. 7 shows one example of an anomaly detection log according to the present embodiment. An anomaly detection log serving as a result detected by anomaly detector 1102 is stored in anomaly detection log holder 1105. In FIG. 7, the anomaly ID, the time detected, the payload value of the message, and the contents of the detected anomaly are illustrated as an example of the anomaly detection log held by anomaly detection log holder 1105.

The anomaly detection log in the first row indicates that the detected anomaly has the anomaly ID of 0x200, that the time detected of the anomaly is 10012, that the payload is 0xFFFFFFFF, and that the contents of the detected anomaly are the anomalous communication amount and the anomalous payload value.

The anomaly detection log in the second row indicates that the detected anomaly has the anomaly ID of 0x200, that the time detected of the anomaly is 10022, that the payload is 0xFFFFFFFF, and that the contents of the detected anomaly are the anomalous communication amount and the anomalous payload value.

The anomaly detection log in the third row indicates that the detected anomaly has the anomaly ID of 0x200, that the time detected of the anomaly is 10032, that the payload is 0xFFFFFFFF, and that the contents of the detected anomaly are the anomalous communication amount and the anomalous payload value.

1.8 One Example of Vehicle Communication Log

FIG. 8 shows one example of a vehicle communication log according to the present embodiment. The vehicle communication log is stored in vehicle communication log holder 3009. In FIG. 8, the communication log sent for each vehicle being monitored is illustrated as an example of the vehicle communication log held by vehicle communication log holder 3009.

In the example shown in FIG. 8, information similar to that in the communication log shown in FIG. 6 is stored with regard to vehicle 10a being monitored.

1.9 One Example of Alert

FIG. 9 shows one example of an alert according to the present embodiment. The alert is stored in alert holder 3010. In FIG. 9, the contents of the alert, the ID of the message, the time when the message has been received, and the payload of the message for each vehicle being monitored are illustrated as an example of the alert held by alert holder 3010.

In the example shown in FIG. 9, information similar to that in the anomaly detection log shown in FIG. 7 is stored with regard to vehicle 10a being monitored.

1.10 One Example of Threat Information

FIG. 10 shows one example of threat information according to the present embodiment. The threat information is stored in threat information holder 3011. In FIG. 10, the threat information ID and the contents of the threat information for each item of threat information are illustrated as an example of the threat information held by threat information holder 3011. Specifically, FIG. 10 shows first threat information pertaining to a threat that has occurred in a vehicle of vehicle type A, which is the first vehicle type.

The threat information with the threat information ID of TID-001 (the first threat information) indicates that the target vehicle type is A, that the influence of the threat is unauthorized brake control, that the name of the anomalous signal is an emergency brake request signal, that the message ID of the anomalous message is 0x200, that the signal value of the anomalous signal is 0x3 (a sudden braking ON request), that the amount of increase in the communication amount of the anomalous message is 50%, that the number of threats observed for each vehicle is 100 for vehicle A001 of vehicle type A and 20 for vehicle A008 of vehicle type A, and that the attack deployability is medium.

Herein, information included in the threat information is not limited to what is illustrated above. For example, the threat information may include a communication capture log that includes an anomalous communication pattern or a rule for detecting an anomalous communication pattern. Furthermore, information to be included in the threat information does not have to include all the items of information shown in FIG. 10.

1.11 One Example of Vehicle Type-Specific Information

FIG. 11 shows one example of vehicle type-specific information according to the present embodiment. The vehicle type-specific information is stored in vehicle type-specific information holder 3012. In FIG. 11, the types and the values of specific information for each vehicle type are illustrated as an example of the vehicle type-specific information held by vehicle type-specific information holder 3012.

FIG. 11 indicates that, with regard to the relationship between the signal and the transmitting and receiving ECU of vehicle type A, the ECU that receives the emergency brake request signal is a brake ECU_A.

It is also indicated that, with regard to the signal processing condition of the ECU of vehicle type A, the condition for processing the emergency brake request signal is that the speed of the vehicle is lower than 40 km/h.

It is further indicated that, with regard to the signal communication network of vehicle type A, the emergency brake request signal is communicated over the chassis network and that the speed signal is communicated over the chassis network and the powertrain network.

It is further indicated that, with regard to the network configuration of vehicle type A, the network adjacent to the chassis network is the powertrain network.

It is further indicated that, with regard to the relationship between the signal and the transmitting and receiving ECU of vehicle type C, the ECU that receives the emergency brake request signal is a brake ECU_C.

It is further indicated that, with regard to the signal processing condition of the ECU of vehicle type C, there is no specific condition for processing the emergency brake request signal.

It is further indicated that, with regard to the signal communication network of the ECU of vehicle type C, the emergency brake request signal is communicated over the ADAS network.

It is further indicated that, with regard to the network configuration of vehicle type C, the network adjacent to the chassis network is the ADAS network.

1.12 One Example of Shared Threat Information

FIG. 12 shows one example of shared threat information according to the present embodiment. The shared threat information is abstracted threat information stored in shared threat information holder 4002. In the example shown in FIG. 12, the contents of the abstracted threat information for each threat information ID are illustrated as an example of the shared threat information held by shared threat information holder 4002.

The contents of the abstracted threat information with the threat information ID of TID-001 indicate that the contents of the control affected by the threat is unauthorized brake control, that the name of the anomalous signal is an emergency brake request signal, that the signal value is the sudden braking ON, that the amount of increase in the anomalous message is 50%, and that the attack deployability is medium. The above is information obtained by abstracting the threat information shown in FIG. 10, and it can be seen that some items of vehicle type-specific information (e.g., the target vehicle type, the message ID of the anomalous message, the specific signal value, and the number of instances observed for each vehicle) have been deleted.

1.13 Threat Information Sharing Sequence

Figure 13:
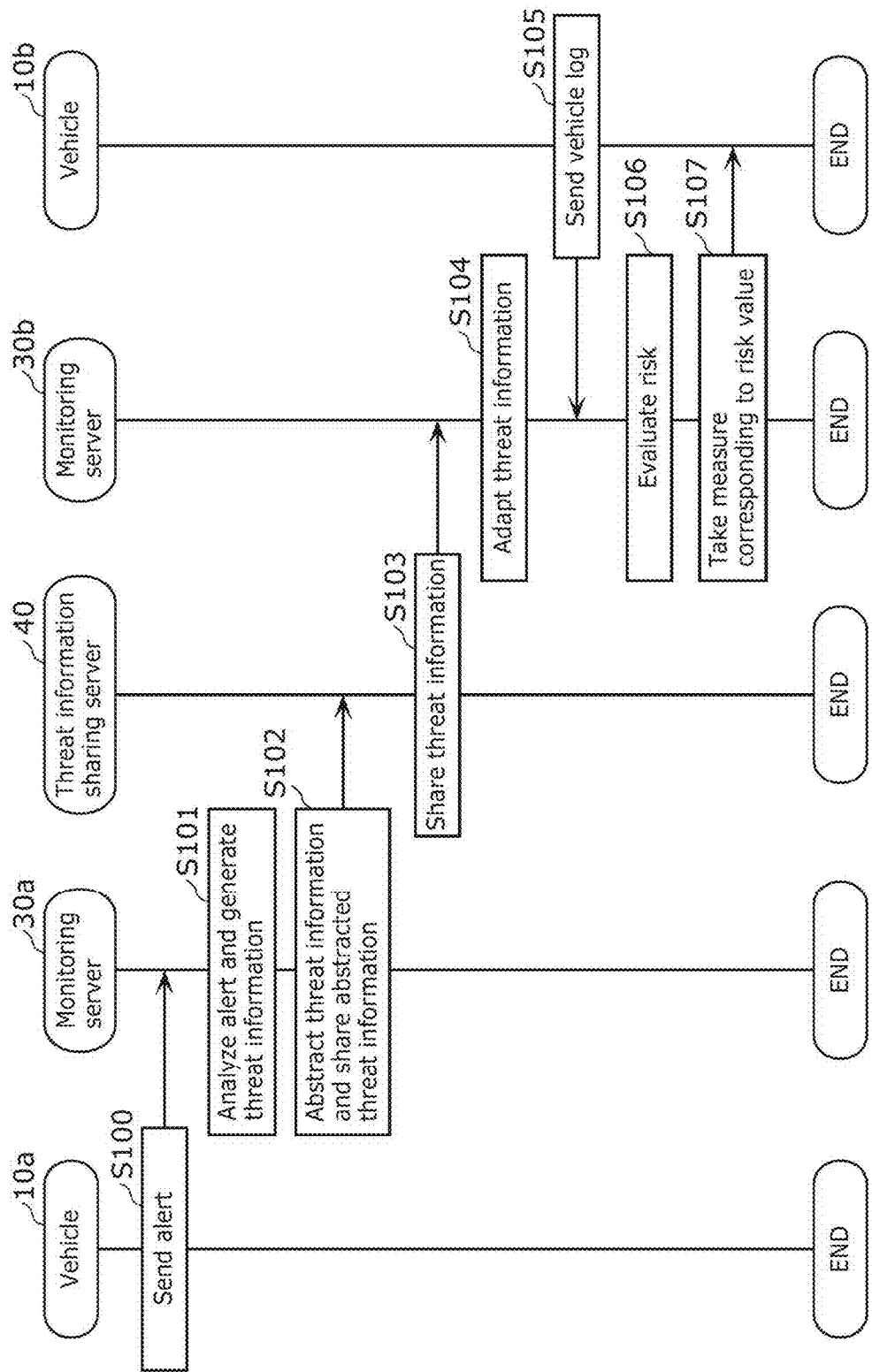
FIG. 13 is a diagram showing a sequence of sharing threat information according to Embodiment 1.

FIG. 13 shows a sequence of communication in the automobile cybersecurity monitoring system performed when threat information is shared and deployed between monitoring server 30a and monitoring server 30b according to the present embodiment.

Vehicle 10a sends, to monitoring server 30a, an anomaly detection alert informing monitoring server 30a that an anomaly is occurring in the vehicle (step S100).

Based on an analysis of the anomaly detection alert received from vehicle 10a, monitoring server 30a generates threat information (step S101).

Monitoring server 30a abstracts the generated threat information by removing information specific to the vehicle type and shares the abstracted threat information with threat information sharing server 40 (step S102).

Threat information sharing server 40 stores the abstracted threat information shared by monitoring server 30a and shares the abstracted threat information with monitoring server 30b (step S103).

Monitoring server 30b determines whether the abstracted threat information shared by threat information sharing server 40 is threat information that can be adapted to the vehicle that monitoring server 30b monitors, adapts the abstracted threat information that can be adapted to each vehicle that monitoring server 30b monitors, and stores the abstracted threat information (step S104).

Vehicle 10b sends a communication log of the vehicle to monitoring server 30b (step S105).

Monitoring server 30b checks whether there is a sign of a threat to vehicle 10b based on the vehicle log and with the use of the threat information that monitoring server 30b holds and that includes the threat information adapted from the abstracted threat information. Specifically, monitoring server 30b evaluates the risk value of the threat information to vehicle 10b based on the vehicle state of vehicle 10b extracted from the vehicle log and the contents of the attack included in the threat information (step S106).

Based on the evaluated risk value, monitoring server 30b determines, for example, the measure to be taken to lower the risk to vehicle 10b or the presence or absence of a matching process between the threat information and the vehicle log (step S107).

1.14 Flowchart of Abstracting Threat Information

Figure 14:
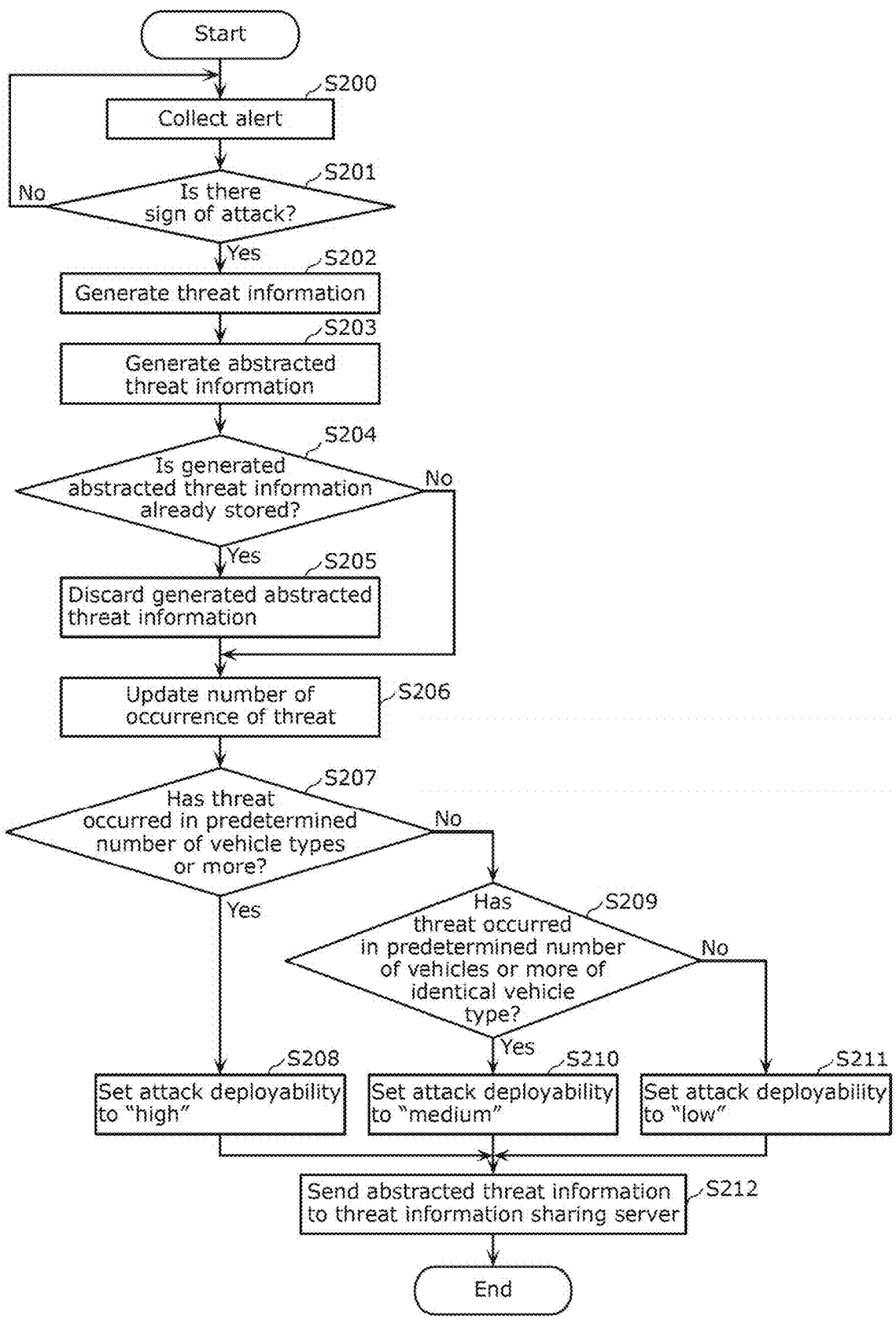
FIG. 14 is a flowchart showing a process of abstracting threat information according to Embodiment 1.

FIG. 14 is a flowchart showing a process of abstracting threat information by monitoring server 30a according to the present embodiment.

Monitoring server 30a collects an alert from vehicle 10a being monitored (step S200).

Monitoring server 30a analyzes the alert and determines whether there is a sign of an attack (step S201). If there is a sign of an attack (if Yes), monitoring server 30a executes the process of step S202. Meanwhile, if there is no sign of an attack (if No), monitoring server 30a returns to the process of step S200.

Concerning the sign of an attack, monitoring server 30a generates threat information based on the collected alert (step S202).

Monitoring server 30a generates abstracted threat information by deleting information specific to the vehicle type from the generated threat information (step S203).

Monitoring server 30a determines whether monitoring server 30a already holds abstracted threat information that matches the generated abstracted threat information and that has been generated from threat information of another vehicle type (step S204). Monitoring server 30a determines that the generated abstracted threat information matches abstracted threat information that monitoring server 30a already holds if data of the generated abstracted threat information completely matches the abstracted threat information that monitoring server 30a already holds or if predetermined data in the generated abstracted threat information partially matches the abstracted threat information that monitoring server 30a already holds (e.g., if the influence and the signal name and signal value of anomalous signals match). If monitoring server 30a already holds identical abstracted threat information (if Yes), monitoring server 30a executes the process of step S205. Meanwhile, if monitoring server 30a does not hold any identical abstracted threat information (if No), monitoring server 30a executes the process of step S206.

If monitoring server 30a already holds the identical abstracted threat information, monitoring server 30a discards the generated abstracted threat information and uses the abstracted threat information that monitoring server 30a already holds (step S205).

Monitoring server 30a updates the number of occurrences of the threat corresponding to the abstracted threat information for the vehicle type of which an alert concerning the abstracted threat information is sent (step S206). For example, if it is determined that the abstracted threat information corresponds to a threat to vehicle type A, a threat to vehicle type B, and a threat to vehicle type C that are all similar to each other, and that there is a sign of an attack on a vehicle of vehicle type A, monitoring server 30a increases the number of occurrences of the threat to vehicle type A by 1.

Monitoring server 30a checks whether the threat corresponding to the abstracted threat information is occurring in a predetermined number of vehicle types or more (step S207). There is no limitation on the predetermined number of vehicle types, and such a number is set as appropriate. If the threat is occurring in the predetermined number of vehicle types or more (if Yes), monitoring server 30a executes the process of step S208. Meanwhile, if the threat is not occurring in the predetermined number of vehicle types or more (if No), monitoring server 30a executes the process of step S209.

If the threat is occurring in the predetermined number of vehicle types or more, monitoring server 30a sets the deployability of the threat corresponding to the abstracted threat information (also referred to as attack deployability) to "high" (step S208). For example, if the threat is occurring in two or more vehicle types, monitoring server 30a sets the attack deployability of the abstracted threat information to "high".

If the threat is not occurring in the predetermined number of vehicle types or more, monitoring server 30a checks whether the threat is occurring in a predetermined number or more of different vehicles of the same vehicle type (step S209). There is no limitation on the predetermined number, and such a number is set as appropriate. If the threat is occurring in the predetermined number or more of different vehicles of the same vehicle type (if Yes), monitoring server 30a executes the process of step S210. Meanwhile, if the threat is not occurring in the predetermined number or more of different vehicles of the same vehicle type (if No), monitoring server 30a executes the process of step S211.

If the threat is occurring in the predetermined number or more of different vehicles of the same vehicle type, monitoring server 30a sets the attack deployability of the abstracted threat information to "medium" (step S210).

If the threat is not occurring in the predetermined number or more of different vehicles of the same vehicle type, monitoring server 30a sets the attack deployability of the abstracted threat information to "low" (step S211).

Herein, not both of step S207 and step S208 need to be performed, and only one of the steps may be performed. Furthermore, the attack deployability may be set at two levels (e.g., "high" and "low").

In this manner, monitoring server 30a (threat information abstractor 3005) calculates the deployability of a threat corresponding to abstracted threat information in accordance with the number of vehicle types of anomalous vehicles or the number of anomalous vehicles indicated by the occurrence status of a threat in each anomalous vehicle in which the threat corresponding to the abstracted threat information has been observed. The calculated attack deployability is used in the calculation of the vehicle type suitability of the abstracted threat information to the second vehicle type and, in turn, of the risk value included in the threat information (the second threat information) adapted to the second vehicle type.

Monitoring server 30a sends the abstracted threat information to which the attack deployability has been set to threat information sharing server 40 for sharing (step S212).

Although from the collecting of the alert to the generating of the threat information is performed by monitoring server 30a in the example described according to the present embodiment, the determining of the attack based on the alert or the generating of the threat information does not have to be performed by monitoring server 30a. For example, a result analyzed by a security analyst based on an alert collected by monitoring server 30a may be registered into monitoring server 30a as threat information.

Furthermore, although the abstracted threat information is sent to threat information sharing server 40 after the attack deployability has been set to the abstracted threat information in the example described above, the abstracted threat information does not have to be sent at this timing. For example, the abstracted threat information may be shared in response to a request from threat information sharing server 40, or abstracted threat information containing the difference from the shared abstracted threat information may be shared at once at a periodic timing.

1.15 Flowchart of Adapting Threat Information to Vehicle

Figure 15:
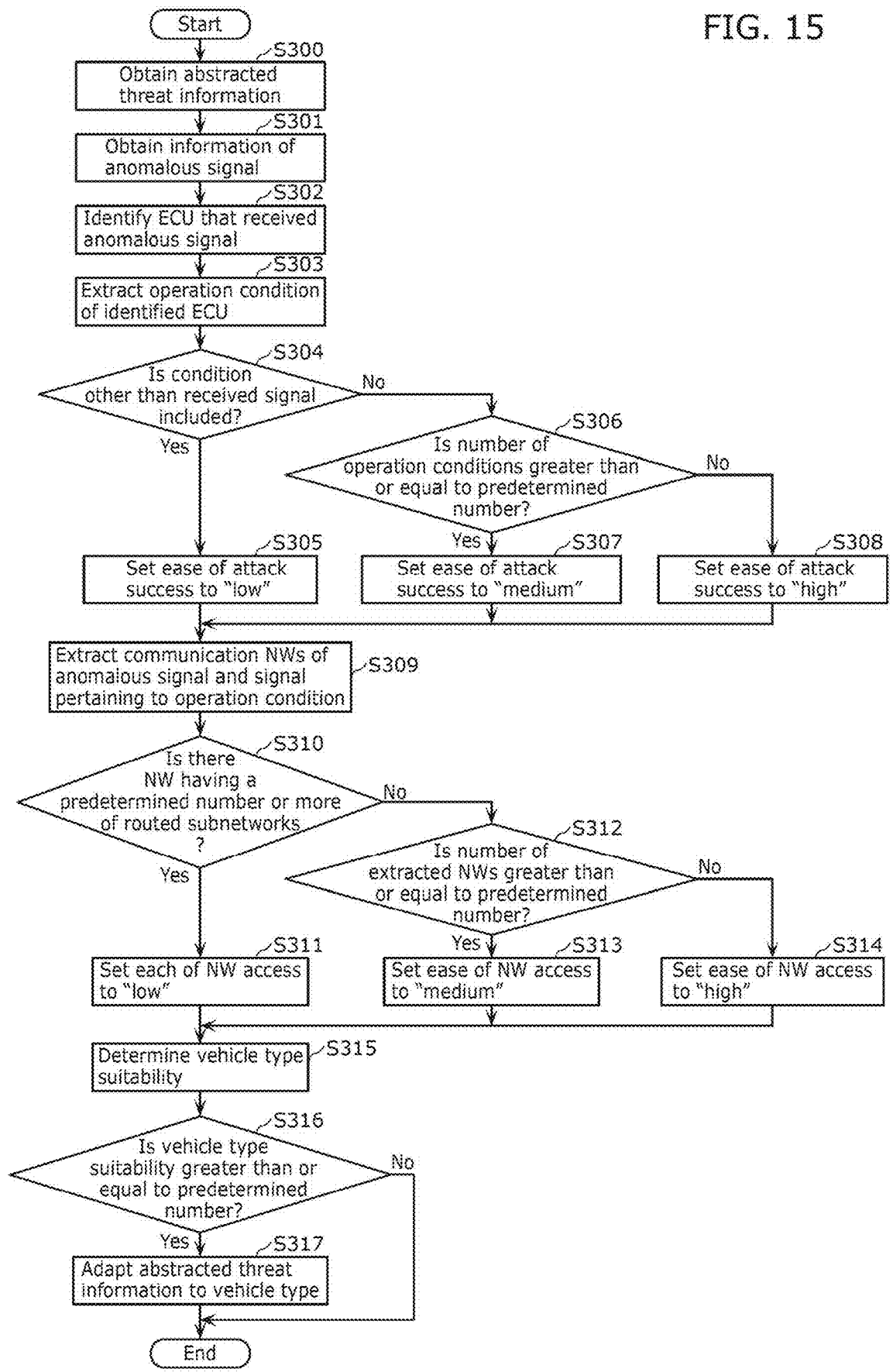
FIG. 15 is a flowchart showing a process of adapting threat information to a vehicle type according to Embodiment 1.

FIG. 15 is a flowchart showing a process of adapting abstracted threat information shared to monitoring server 30b to a vehicle that monitoring server 30b monitors according to the present embodiment.

Monitoring server 30b obtains abstracted threat information from threat information sharing server 40 (step S300).

Monitoring server 30b obtains information, included in the abstracted threat information, of an anomalous signal that may serve as a sign of an attack (step S301). The anomalous signal that may serve as a sign of an attack is, for example, an emergency brake request signal, as shown in FIG. 12.

Monitoring server 30b refers to the vehicle type-specific information of vehicle 10b that monitoring server 30b monitors and identifies the ECU that receives the anomalous signal (step S302). For example, if the vehicle type of vehicle 10b is vehicle type C, as shown in FIG. 11, the ECU that receives the emergency brake request signal can be identified as the brake ECU_C.

Monitoring server 30b refers to the vehicle type-specific information and extracts the operation condition of the ECU observed when the identified ECU processes the anomalous signal (step S303). The processing condition of the anomalous signal is the value (the condition) corresponding to that signal as included in the signal processing condition of the ECU stored in vehicle type-specific information holder 3012 (e.g., the speed is lower than 40 km/h). If no value corresponding to the signal is present, the operation condition is determined not to exist in particular. For example, if the vehicle type of vehicle 10b is vehicle type C, as shown in FIG. 11, there is no condition under which the brake ECU_C processes an emergency brake request signal.

Monitoring server 30b determines whether the extracted operation condition (the condition for processing the anomalous signal) includes a condition other than a condition pertaining to a signal that the ECU receives from the in-vehicle network (step S304). Specifically, monitoring server 30b determines whether the condition for processing the anomalous signal includes a condition pertaining to the information that the identified ECU receives from other than a message received from the in-vehicle network. For example, if the condition for processing the anomalous signal includes a condition pertaining to the information obtained through the ECU's direct sensing without involving the in-vehicle network, monitoring server 30b determines that the extracted operation condition includes a condition other than a signal that the ECU receives from the in-vehicle network. For example, if the extracted operation condition includes a condition pertaining to information from a speed sensor or a LIDAR, the determination of Yes is made at step S304.

If the extracted operation condition includes a condition other than the condition pertaining to the signal that the ECU receives from the in-vehicle network (if Yes), monitoring server 30b executes the process of step S305. Meanwhile, if the extracted operation condition does not include a condition other than the condition pertaining to the signal that the ECU receives from the in-vehicle network (if No), monitoring server 30b executes the process of step S306.

If the extracted operation condition includes a condition other than the condition pertaining to the signal that the ECU receives from the in-vehicle network, monitoring server 30b sets the ease of an attack succeeding on the second vehicle type (also referred to as ease of attack success) to "low" (step S305). That the ease of attack success is "low" indicates that it is difficult for the attacker accessing the in-vehicle network to control the condition for causing the threat to occur.

If the extracted operation condition does not include a condition other than the condition pertaining to the signal that the ECU receives from the in-vehicle network, monitoring server 30b determines whether the number of operation conditions for processing an anomalous signal is greater than or equal to a predetermined number (step S306). There is no limitation on the predetermined number, and such a number is set as appropriate. If the number of operation conditions for processing an anomalous signal is greater than or equal to the predetermined number (if Yes), monitoring server 30b executes the process of step S307. Meanwhile, if the number of operation conditions for processing an anomalous signal is neither greater than nor equal to the predetermined number (if No), monitoring server 30b executes the process of step S308.

If the number of operation conditions for processing an anomalous signal is greater than or equal to the predetermined number, monitoring server 30b sets the ease of attack success to "medium" (step S307). That the ease of attack success is "medium" indicates that, although the attacker who can access the in-vehicle network can control the condition for causing the threat to occur, the attacker needs to control a plurality of conditions.

If the number of operation conditions for processing an anomalous signal is neither greater than nor equal to the predetermined number, monitoring server 30b sets the ease of attack success to "high" (step S308). That the ease of attack success is "high" indicates that it is relatively easy for the attacker who can access the in-vehicle network to satisfy the operation condition for causing the threat to occur.

Herein, if an anti-tamper measure or access control is being taken on a signal that the ECU receives, monitoring server 30b may set the ease of attack success lower.

Monitoring server 30b refers to the vehicle type-specific information and extracts a network over which an anomalous signal included in the abstracted threat information is communicated and a network over which a signal pertaining to the operation condition extracted at step S303 is communicated (step S309). If the signal pertaining to the operation condition is, for example, about the speed, monitoring server 30b extracts the network that corresponds to the speed signal indicated by the signal communication network stored in vehicle type-specific information holder 3012 (e.g., the chassis network and the powertrain network, as shown in FIG. 11). If there are a plurality of signals that pertain to the operation condition, a communication network is extracted in a similar manner for each of the plurality of signals.

Monitoring server 30b calculates, for each of the extracted networks, the number of subnetworks to be routed from an out-vehicle communication device provided in vehicle 10b, and determines whether there is a network whose number of subnetworks to be routed is greater than or equal to a predetermined number (step S310). There is no limitation on the predetermined number, and such a number is set as appropriate. If there is a network whose number of subnetworks to be routed is greater than or equal to the predetermined number (if Yes), monitoring server 30b executes the process of step S311. Meanwhile, if there is no network whose number of subnetworks to be routed is greater than or equal to the predetermined number (if No), monitoring server 30b executes the process of step S312.

If there is a network whose number of subnetworks to be routed is greater than or equal to the predetermined number, monitoring server 30b sets the ease of access to this network (also referred to as the ease of network access) to "low" (step S311). That the ease of network access is "low" indicates that it is difficult for an attacker outside the vehicle to access the target network to inject an anomalous signal.

If there is no network whose number of subnetworks to be routed is greater than or equal to the predetermined number, monitoring server 30b determines, with regard to the target networks extracted at step S309, whether the number of different networks is greater than or equal to a predetermined number (step S312). There is no limitation on the predetermined number, and such a number is set as appropriate. If the number of different networks is greater than or equal to the predetermined number (if Yes) monitoring server 30b executes the process of step S313. Meanwhile, if the number of different networks is neither greater than nor equal to the predetermined number (if No), monitoring server 30b executes the process of step S314.

If the number of different networks is greater than or equal to the predetermined number, monitoring server 30b sets the ease of network access to "medium" (step S313). That the ease of network access is "medium" indicates that, although it is relatively easy for an attacker to access the target network from the outside of the vehicle, the attacker needs to access a plurality of networks.

If the number of different networks is less than the predetermined number, monitoring server 30b sets the ease of network access to "high" (step S314). That the ease of network access is "high" indicates that it is easy for an attacker outside the vehicle to access the target network and the number of networks that the attacker needs to access is not high.

Monitoring server 30b determines the suitability of the abstracted threat information to the vehicle type being monitored based on the ease of attack success that has been set, the ease of network access that has been set, and the attack deployability included in the abstracted threat information (step S315).

FIG. 16 is a diagram showing one example of a vehicle type suitability determination matrix according to the present embodiment. Monitoring server 30*b* determines the suitability of abstracted threat information to the vehicle type being monitored based on the vehicle type suitability determination matrix shown in FIG. 16. For example, if the attack deployability is medium, if the ease of attack success is medium, and if the ease of target NW access is medium, the vehicle type suitability is determined to be "medium" based on the vehicle type suitability determination matrix shown in FIG. 16.

In this manner, monitoring server 30*b* (threat information adapter 3008) calculates the suitability of abstracted threat information to the second vehicle type with the use of the abstracted threat information and the vehicle type-specific information pertaining to the second vehicle type.

For example, monitoring server 30*b* (threat information adapter 3008) calculates the suitability with the use of the ease of attack success in the second vehicle type which is determined based on at least one of whether the operation condition for processing a signal that has caused the threat corresponding to the abstracted threat information includes a condition pertaining to a signal outside the in-vehicle network of vehicle 10*b* of the second vehicle type, whether a predetermined number or more of such operation conditions are present, or whether an anti-alternation measure or access control is being taken on a signal that the ECU of vehicle 10*b* receives.

Furthermore, for example, monitoring server 30*b* (threat information adapter 3008) calculates the suitability with the use of the ease of access to a communication network determined in accordance with the number of subnetworks to be routed from an external connection device connected to a network outside the vehicle among the ECUs provided in vehicle 10*b* of the second vehicle type to the communication network in vehicle 10*b* of the second vehicle type over which a signal that has caused the threat corresponding to the abstracted threat information is communicated.

Monitoring server 30*b* determines whether the vehicle type suitability is greater than or equal to a predetermined value (step S316). There is no particular limitation on the predetermined value, and the predetermined value is, for example but is not limited to, "medium". If the vehicle type suitability is greater than or equal to the predetermined value (if Yes), monitoring server 30*b* executes the process of step S317. If the vehicle type suitability is neither greater than nor equal to the predetermined value (if No), monitoring server 30*b* terminates the process without adapting the abstracted threat information to vehicle 10*b* being monitored.

If the vehicle type suitability is greater than or equal to the predetermined value, monitoring server 30*b* generates threat information by adapting the abstracted threat information to the vehicle type with the use of the vehicle type-specific information of the vehicle type being monitored. For example, monitoring server 30*b* can adapt the abstracted threat information to the vehicle type being monitored by adding information that allows specific anomalous communication in the vehicle type being monitored to be detected by, for example but not limited to, adding the ID of the message that includes the signal to the signal included in the abstracted information or by adding an anomalous payload to the signal included in the abstracted threat information.

Monitoring server 30*b* according to the present embodiment determines the vehicle type suitability with the use of a vehicle type suitability matrix such as the one shown in FIG. 16 based on the ease of attack success, the ease of network access, and the attack deployability. Monitoring server 30*b*, however, does not have to determine the vehicle type suitability based on all of these items of information. For example, monitoring server 30*b* may determine the vehicle type suitability based on any one or more of the items of information above or determine the vehicle type suitability based on a desired combination of some of the items of information above.

Figure 17:
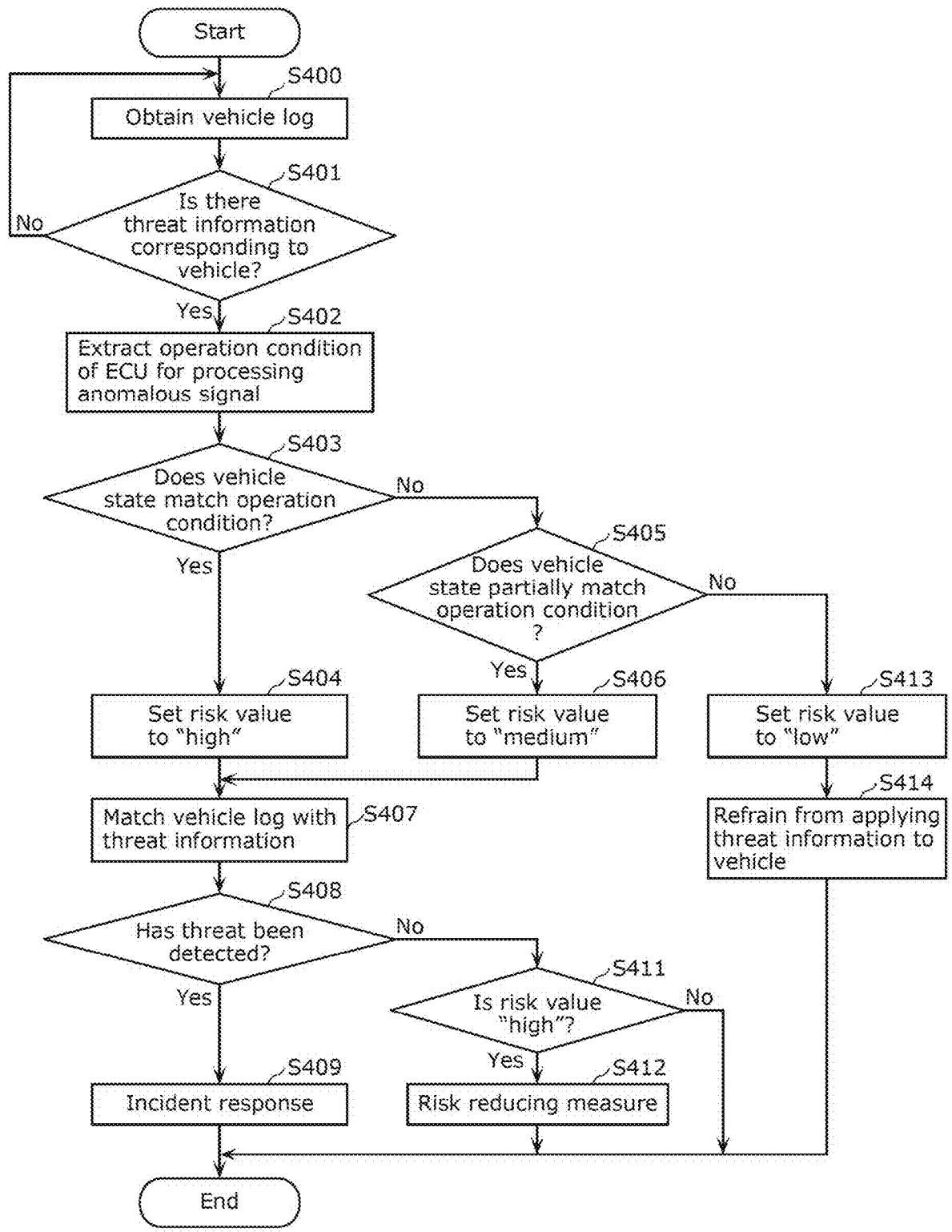
FIG. 17 is a flowchart showing a process of determining the risk of threat information based on a vehicle state according to Embodiment 1.

1.16 Flowchart of Determining Risk of Threat Information Based on Vehicle State FIG. 17 is a flowchart of a process through which monitoring server 30*b* determines the risk of threat information based on the vehicle state.

Monitoring server 30*b* obtains a vehicle communication log from vehicle 10*b* (step S400).

Monitoring server 30*b* determines whether there is threat information corresponding to vehicle 10*b* among the threat information that monitoring server 30*b* holds (step S401). The threat information that monitoring server 30*b* holds includes threat information created from abstracted threat information so as to adapt to the vehicle type that monitoring server 30*b* monitors. If there is no threat information that corresponds to vehicle 10*b* (if No), monitoring server 30*b* returns the process of step S400. Meanwhile, if there is threat information that corresponds to vehicle 10*b* (if Yes), monitoring server 30*b* executes the process of step S402.

Referring to the vehicle type-specific information of vehicle 10*b*, monitoring server 30*b* extracts an operation condition for processing an anomalous signal with regard to the ECU that processes an anomalous signal included in the threat information (step S402).

Monitoring server 30*b* determines whether the vehicle state included in the communication log of vehicle 10*b* matches the operation condition extracted at step S402 (step S403). If the vehicle state matches the operation condition (if Yes), monitoring server 30*b* executes the process of step S404. Meanwhile, if the vehicle state does not match the operation condition (if No), monitoring server 30*b* executes the process of step S405. Herein, the vehicle state is determined by the operation condition of the ECU. For example, if the operation condition of the ECU is only the condition concerning the speed, the vehicle state is the state concerning the speed. If there are a plurality of operation conditions, the vehicle state is determined by a combination of signals pertaining to the plurality of operation conditions. For example, if the vehicle state is the state concerning the speed, it is determined whether the speed signal (the latest value if there are a plurality of speed signals) included in the communication log of vehicle 10*b* matches the operation condition (e.g., whether the speed is lower than 40 km/h). If there are a plurality of conditions, whether the conditions of all the signals are satisfied is determined. Herein, if there are not a plurality of operation conditions, step S405 does not have to be performed, and along with that, either of step S406 and step S413 does not have to be performed.

If the vehicle state included in the vehicle log matches the operation condition extracted at step S402, monitoring server 30*b* sets the risk value of the threat information corresponding to vehicle 10*b* being monitored to "high" (step S404). That the risk value is "high" indicates a state in which the risk of an occurrence of the threat indicated by the threat information in vehicle 10b is high.

If the vehicle state included in the vehicle log does not match the operation condition extracted at step S402, monitoring server 30b determines whether the vehicle state partially matches the operation condition (step S405). That the vehicle state partially matches the operation condition means that the vehicle state matches one or more of a plurality of operation conditions. If the vehicle state partially matches the operation condition (if Yes), monitoring server 30b executes the process of step S406. Meanwhile, if the vehicle state does not match the operation condition even partially (if No), monitoring server 30b executes the process of step S413.

If the state of the vehicle being monitored partially matches the operation condition extracted at step S402, monitoring server 30b sets the risk value of vehicle 10b being monitored to "medium" (step S406). That the risk value is "medium" indicates a state in which the threat included in the threat information is not to occur immediately.

If the state of the vehicle being monitored does not even partially match the operation condition extracted at step S402, monitoring server 30b sets the risk value of vehicle 10b being monitored to "low" (step S413). That the risk value is "low" indicates that the possibility of the threat included in the threat information occurring is low.

Monitoring server 30b does not at this point apply the threat information whose risk value is "low" to vehicle 10b being monitored (step S414).

In this manner, monitoring server 30b (risk evaluator 3006) calculates the risk value with regard to vehicle 10b in accordance with the degree of match between the operation condition for processing a signal that has caused the threat corresponding to the abstracted threat information and the state of vehicle 10b included in the vehicle log.

Herein, monitoring server 30b (risk evaluator 3006) calculates the risk value based on the threat information that adapts to the vehicle type of the vehicle that monitoring server 30b monitors (the threat information with a high vehicle type suitability). Therefore, it can be said that monitoring server 30b calculates the risk value based on the vehicle type suitability. Furthermore, the vehicle type suitability is calculated based on the attack deployability. Therefore, it can be said that monitoring server 30b (risk evaluator 3006) calculates the risk value based on the attack deployability.

The threat information having the risk value set therein in the manner described above is one example of second threat information that includes the risk value indicating the risk level of the threat to the vehicle type of vehicle 10b (the second vehicle type).

If the risk value with regard to vehicle 10b being monitored is "high" or "medium", monitoring server 30b performs a matching process on the communication log of the vehicle and the anomalous signal included in the threat information (step S407). Through this process, monitoring server 30b determines whether a threat is occurring in vehicle 10b being monitored.

Monitoring server 30b determines whether monitoring server 30b has detected a threat as a result of the matching of the threat information (step S408). If monitoring server 30b has detected a threat (if Yes), monitoring server 30b executes the process of step S409. Meanwhile, if monitoring server 30b does not detect a threat (if No), monitoring server 30b executes the process of step S411.

If monitoring server 30b has detected a threat, monitoring server 30b determines that an attack on vehicle 10b being monitored is occurring and carries out an incident response (step S409). An incident response may be carried out, for example, by incurring an automatic response such as sending a security alert to vehicle 10b being monitored to shift to a degraded mode of allowing the function of vehicle 10b to operate in a limited capacity or by notifying a security analyst of the detection of the threat to prompt a response.

If monitoring server 30b does not detect any threat, monitoring server 30b determines whether the risk value of vehicle 10b being monitored is "high" (step S411). If the risk value is "high", monitoring server 30b executes step S412. Meanwhile, if the risk value is not "high", monitoring server 30b terminates the process.

If the risk value of vehicle 10b being monitored is "high", monitoring server 30b, assuming that the risk is high even in a situation in which no threat is occurring in vehicle 10b, takes a risk reducing measure (step S412). The risk reducing measure may be taken, for example, by taking an automatic measure such as instructing vehicle 10b being monitored to disable the vehicle control function pertaining to the threat, instructing the ECU to disable an anomalous signal, informing the driver that the risk of being attacked is high, or lowering the risk value through an update of the ECU's firmware or by informing a security analyst that the risk is high to prompt a risk reducing measure.

In this manner, monitoring server 30b (threat information utilizer 3004) determines the response to the threat to the second vehicle type in accordance with the risk value. For example, such a response may at least one of a matching process between an anomalous communication pattern indicated by the second threat information and a communication log collected from vehicle 10b of the second vehicle type, an update of the firmware of the ECU provided in vehicle 10b, the limiting of the function of vehicle 10b, or the sending of an alert to a security analyst.

In the example described according to the present embodiment, the risk value is determined in accordance with the degree of match between the operation condition pertaining to the process by the ECU of the anomalous signal included in the threat information and the vehicle state included in the vehicle communication log. Alternatively, the vehicle state does not have to be information extracted from the vehicle communication log. For example, the risk value may be determined in accordance with the vehicle state sent directly from vehicle 10b.

Furthermore, in the example described according to the present embodiment, the risk value is determined in accordance with the degree of match between the operation condition pertaining to the process by the ECU of the anomalous signal included in the threat information and the vehicle state included in the vehicle communication log. The information for determining the risk value, however, is not limited thereto. For example, the degree of influence included in the threat information may be used to determine the risk value. For example, the degree of influence is set to "high" if the contents of the thread pertain to unauthorized control of the vehicle, is set to "medium" if the contents of the threat pertain to the stopping or the interrupting of the vehicle's function, or is set to "low" if the contents pertain to others, and the risk value may be determined holistically with the use of such degrees of influence. Furthermore, the risk value may be determined holistically with the additional use of the attack deployability or the vehicle type suitability.

In the example described according to the present embodiment, the threat information whose risk value has been determined to be "low" is not applied to vehicle 10b being monitored. The risk value at which the threat information is not applied, however, is not limited thereto. For example, depending on the resources of the server, there may be a case in which the threat information whose risk value is "medium" is not applied.

In the example described according to the present embodiment, the threat information pertaining to the threat that has occurred in vehicle 10a of the first vehicle type that monitoring server 30a monitors is deployed to vehicle 10b of the second vehicle type that monitoring server 30b monitors, but this is not a limiting example. For example, one monitoring server may monitor a vehicle of the first vehicle type as well as a vehicle of the second vehicle type, and threat information pertaining to a threat that has occurred in the vehicle of the first vehicle type that the aforementioned monitoring server monitors may be deployed to the vehicle of the second vehicle type that the same monitoring server monitors. In this case, the one monitoring server may perform the generating of the abstracted threat information, the adapting of the abstracted threat information to the second vehicle type, and the evaluating of the risk value.

1.17 Display Example 1 of Occurrence Status of Similar Threat

Figure 18:
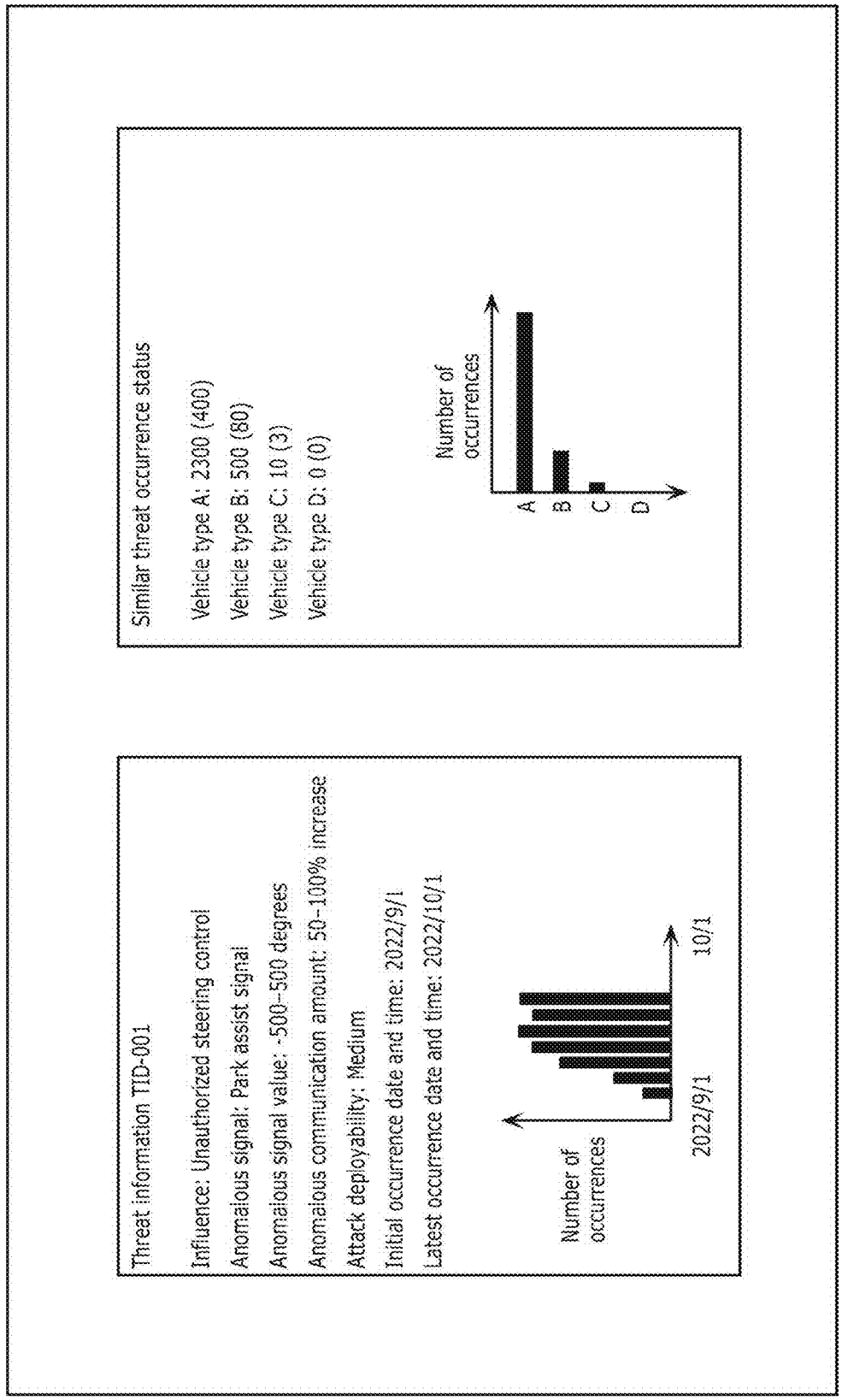
FIG. 18 is a diagram showing an example of displaying an occurrence status of a similar threat according to Embodiment 1.

FIG. 18 is a diagram showing an example of how display 3002 of monitoring server 30a or 30b displays an occurrence status of a similar threat corresponding to abstracted threat information. This display is rendered for a manager of monitoring server 30a or 30b or a security analyst to check the derivative relationship of abstracted threat information or the occurrence status for each vehicle type.

The left side of FIG. 18 shows, in a time-series bar graph, the number of occurrences of the threat being observed, in addition to the contents of the threat information, for the selected abstracted threat information with the indicated ID. Meanwhile, the right side of FIG. 18 shows the occurrence status of threats for the threats that have occurred in different vehicle types and that correspond to the selected abstracted threat information, with a threat that matches the threat information on the left side regarded as a similar threat. The example shown in FIG. 18 indicates that, with regard to abstracted threat information TID-001, 2,300 instances of similar threats have occurred in vehicle type A and that the attack has been deployed to 400 vehicles among the vehicles of vehicle type A. Meanwhile, the example also indicates that, with regard to vehicle type B, 500 instances of similar threats have occurred and that the attack has been deployed to 80 vehicles among the vehicles of vehicle type B. The examples further indicates that, with regard to vehicle type C, 10 instances of similar threats have occurred and that the attack has been deployed to 3 vehicles among the vehicles of vehicle type C. The example further indicates that, with regard to vehicle type D, no similar threat has occurred.

1.18 Display Example 2 of Occurrence Status of Similar Threat

Figure 19:
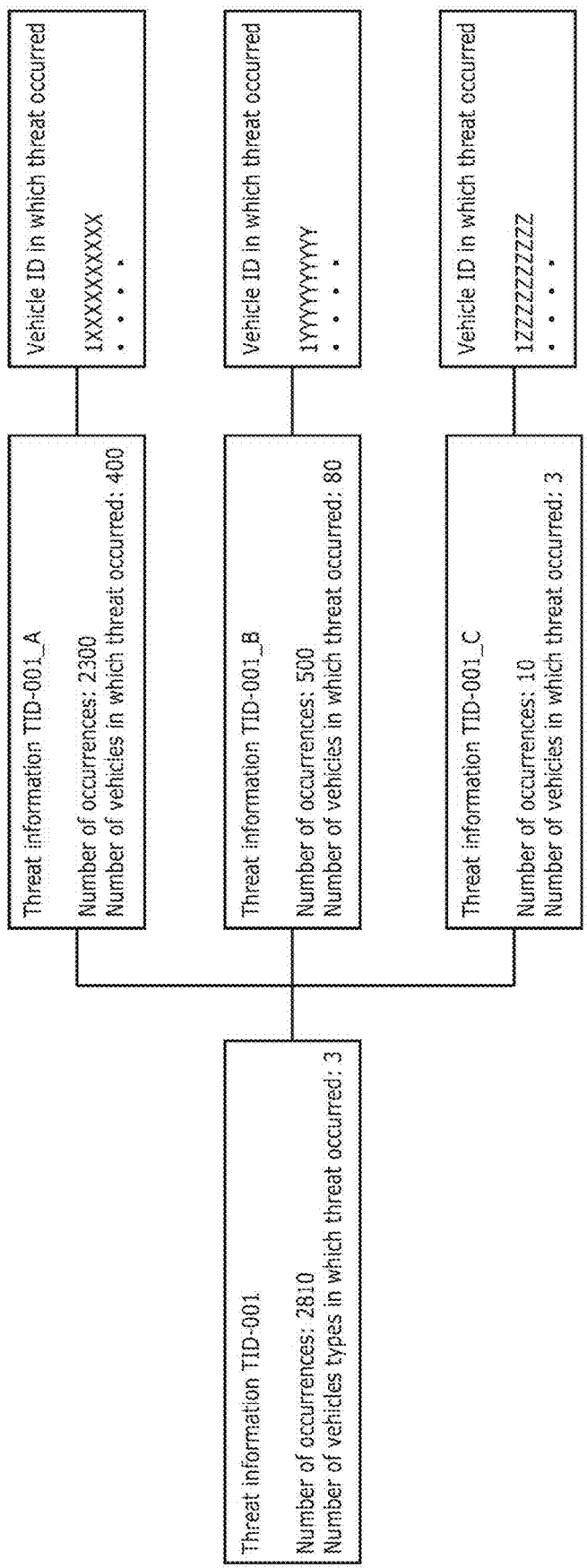
FIG. 19 is a diagram showing another example of displaying an occurrence status of a similar threat according to Embodiment 1.

FIG. 19 is a diagram showing an example of how display 3002 of monitoring server 30a or 30b displays an occurrence status of a similar threat corresponding to abstracted threat information. This display is rendered for a manager of monitoring server 30a or 30b or a security analyst to check the derivative relationship of abstracted threat information or the occurrence status for each vehicle type.

In FIG. 19, abstracted threat information is arranged as TID-001, and the total number of occurrences of similar threats in the vehicle being monitored (2,810 instances) and the number of vehicle types in which the similar threat has occurred (3 vehicle types) are displayed. Meanwhile, threat information that has derived from TID-001 and adapted to vehicle type A is TID-001_A, and the number of occurrences in vehicle type A (2,300 instances) and the number of vehicles in which the threat has occurred (400 vehicles) are displayed. Furthermore, the vehicle ID (1XXXXXXXXXX) of the vehicle in which the threat of threat information TID-001_A has occurred is also displayed. Meanwhile, the threat information adapted to vehicle type B is TID-001_B, and the number of occurrences in vehicle type B (500 instances) and the number of vehicles in which the threat has occurred (80 vehicles) are displayed. Furthermore, the vehicle ID (1YYYYYYYYYY) of the vehicle in which the threat of threat information TID-001_B has occurred is also displayed. Meanwhile, the threat information adapted to vehicle type C is TID-001_C, and the number of occurrences in vehicle type C (10 instances) and the number of vehicles in which the threat has occurred (3 vehicles) are displayed. Furthermore, the vehicle ID (1ZZZZZZZZZZ) of the vehicle in which the threat of threat information TID-001_C has occurred is also displayed.

Figure 20:
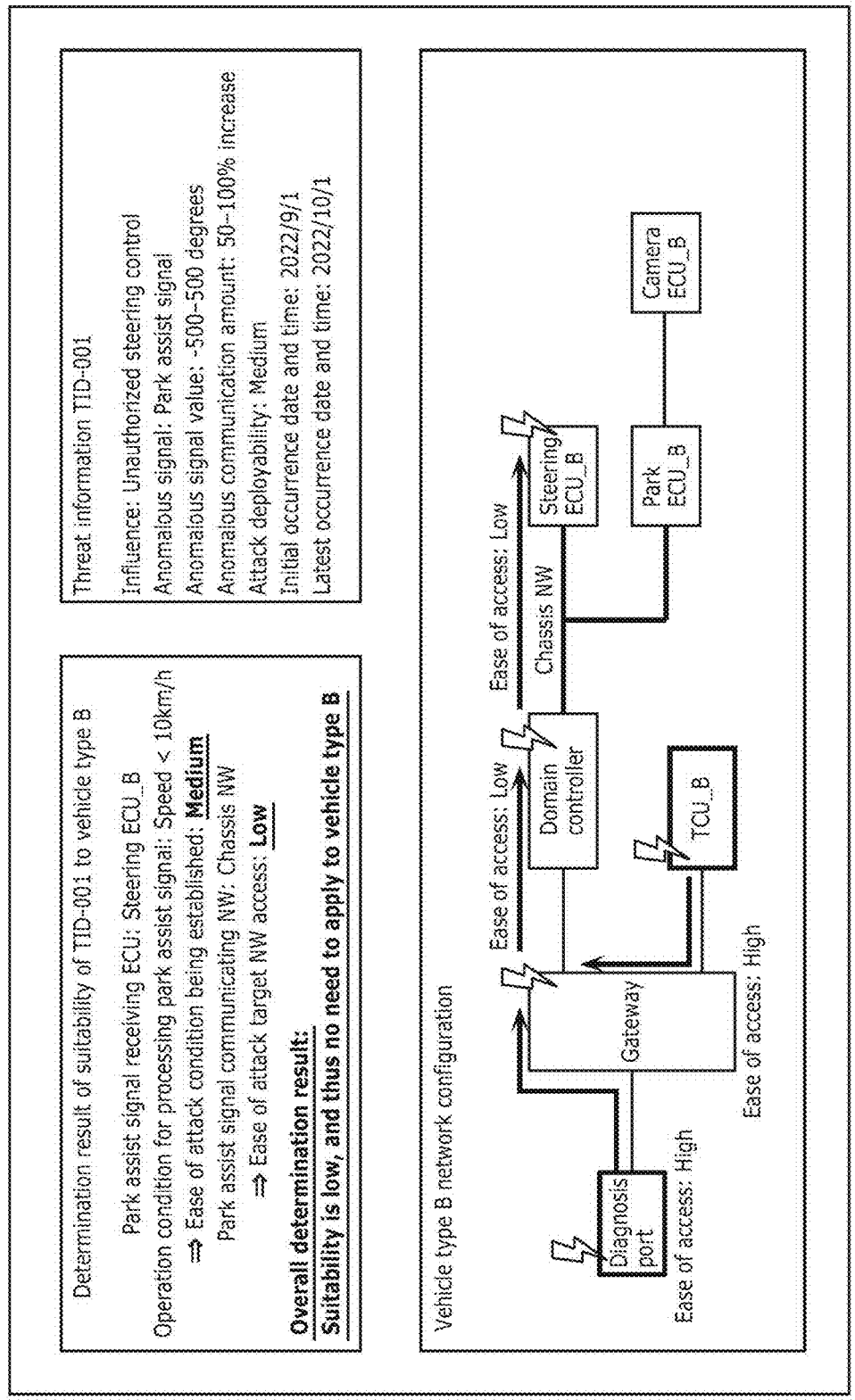
FIG. 20 is a diagram showing an example of displaying a determination of vehicle type suitability of threat information according to Embodiment 1.

1.19 Display Example of Vehicle Type Suitability Determination of Threat Information FIG. 20 is a diagram showing an example of how display 3002 of monitoring server 30a displays the vehicle type suitability determination of threat information. This display is rendered, for example, for a security analyst to check the basis for the vehicle type adaptation after the vehicle type adapting process of the abstracted threat information has been performed.

The upper left section of FIG. 20 displays the result of determining the suitability of abstracted threat information to vehicle type B. Abstracted threat information (threat information from which information specific to the vehicle type has been deleted) and the result from referring to the vehicle type-specific information of vehicle type B are displayed. The display indicates that the ECU that receives a park assist signal is a steering ECU_B, that the operation condition for processing the park assist signal is that the speed is lower than 10 km/h, and that the ease of attack condition establishment under the above condition has been determined to be medium. Furthermore, the display indicates that the network over which the park assist signal is communicated is the chassis network and that the ease of access to the attack target NW under the above conditions has been determined to be low. According to the overall determination result displayed, since the suitability to vehicle type B has been determined to be low, the threat information is not to be applied.

The upper right section of FIG. 20 displays the details of the abstracted threat information. Abstracted threat information TID-001 indicates that the influence of the threat is unauthorized control of the steering wheel, that the anomalous signal is a park assist signal, that the observed anomalous signal value is from −500 degrees to 500 degrees, that an increase in the communication amount of from 50% to 100% has been observed as the anomalous communication amount, and that the attack deployability has been determined to be medium. Furthermore, abstracted threat information TID-001 indicates that the date and time when the threat was first observed was Sep. 1, 2022 and that the last date and time when the thread occurred was Oct. 1, 2022.

The lower section of FIG. 20 shows the configuration of the in-vehicle network of vehicle type B and shows the route to the chassis network (subnetworks) from the diagnosis port serving as a connection device to the outside of the vehicle and from TCU-B. For example, the diagram shows that the ease of access to the chassis network connected to the steering ECU_B that receives the anomalous signal and a park ECU_B serving as the legitimate transmitting ECU of the anomalous signal is low.

Figure 21:
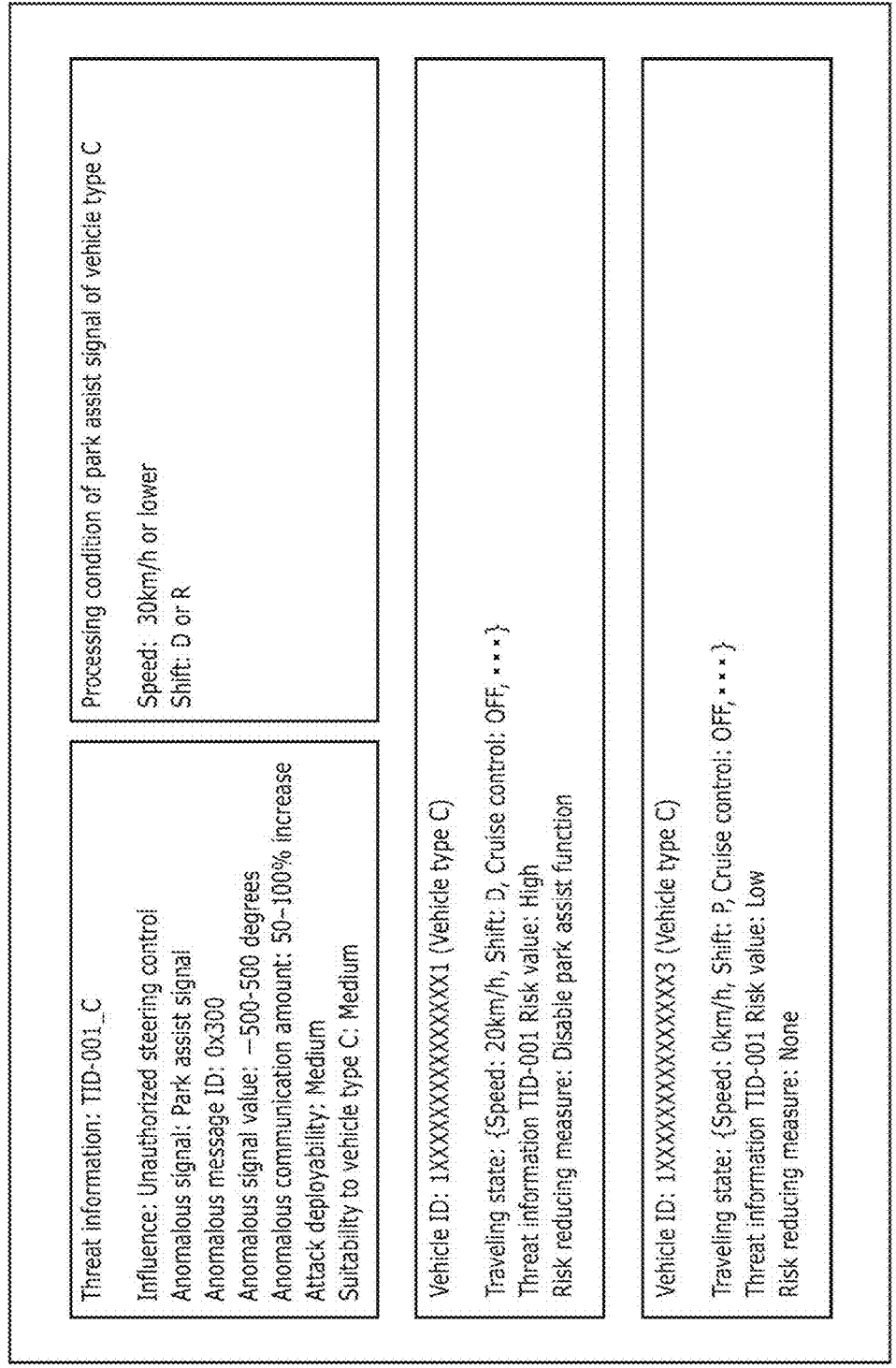
FIG. 21 is a diagram showing an example of displaying a risk value of threat information based on a vehicle state according to Embodiment 1.

1.20 Display Example of Risk Value of Threat Information Based on Vehicle State FIG. 21 is an example of how display 3002 of monitoring server 30*a* or 30*b* displays the risk value of threat information based on the vehicle state. This display is rendered to allow, with regard to the specific threat information for a specific vehicle type (second threat information), the risk value of each vehicle type to be checked at a glance.

The upper left section of FIG. 21 displays the details of threat information adapted to vehicle type C. Threat information TID-001_C indicates that the influence is unauthorized control of the steering wheel, that the anomalous signal is a park assist signal, that the anomalous message ID is 0x300, that the anomalous signal value is within the range of from −500 degrees to 500 degrees, that there has been an increase in the communication amount of from 50% to 100% as the anomalous communication amount, that the attack deployability is medium, and that the suitability to vehicle type C is medium.

The upper right section of FIG. 21 displays the condition for processing an anomalous signal included in the threat information of vehicle type C. It is indicated that, in vehicle type C, the condition for processing the park assist signal is that the speed is lower than or equal to 30 km/h and the shift is in the D or R state.

The middle section of FIG. 21 shows the contents from evaluating the risk value of the vehicle with the vehicle ID of 1XXXXXXXXXXXXXXX1. It is indicated that the traveling state shows the speed of 20 km/h, that the shift is in D, and that the cruise control function is OFF. It is also indicated that, since the condition for processing the park assist signal is being satisfied, the risk value is set "high". Furthermore, it is indicated that the park assist function is being disabled as a risk reducing measure.

The lower section of FIG. 21 shows the contents from evaluating the risk value of the vehicle with the vehicle ID of 1XXXXXXXXXXXXXXX3. It is indicated that the traveling state shows the speed of 0 km/h, that the shift is in P, and that the cruise control function is OFF. It is also indicated that, since the condition for processing the park assist signal is not satisfied, the risk value is set "low". Furthermore, it is indicated that there is no particular risk reducing measure.

For example, if the vehicle type suitability is higher than or equal to a predetermined value, the outputter (e.g., display 3002) outputs second threat information. In other words, if the vehicle type suitability is lower than the predetermined value, the outputter does not have to output the second threat information.

1.21 Advantageous Effects of Embodiment 1

Monitoring server 30*a* according to the present embodiment abstracts threat information generated based on a log collected from vehicle 10*a* and determines the attack deployability in accordance with the number of vehicle types or of vehicles in which an alert with matching abstracted threat information has occurred. This configuration makes it possible to grasp how easy it is to deploy a threat that has occurred in a specific vehicle to a different vehicle type or a different vehicle.

Furthermore, monitoring server 30*b* determines, from the signal to be altered included in the threat information, the vehicle type suitability of the threat based on the condition pertaining to the signal processing by the ECU that receives the signal included in the vehicle type-specific information and the network over which the signal is received. This configuration makes it possible to determine whether the threat information generated in another vehicle type is effective on vehicle 10*b* that monitoring server 30*b* monitors.

Furthermore, monitoring server 30*b* calculates the risk value of the threat information from the vehicle state of vehicle 10*b* being monitored and the condition pertaining to the signal processing by the ECU that receives the signal to be altered included in the threat information. This configuration makes it possible to respond in accordance with the risk of the threat information that may vary for each vehicle state of vehicle 10*b* being monitored.

In this manner, monitoring server 30*a* or 30*b* according to the present embodiment can determine whether a threat that has occurred in specific vehicle 10*a* is threat information that can be deployed to another vehicle 10*b*, whether that threat can be adapted to the vehicle type being monitored, or how high the risk of the threat information is in the current vehicle state, and can respond to the threat in accordance with the risk value.

Other Variations

The present disclosure has been described based on the foregoing embodiment. It is needless to say, however, that the foregoing embodiment does not limit the present disclosure. The cases such as the following are also encompassed by the present disclosure.

(1) Although there is no particular limitation on the physical layer or the data link layer of the in-vehicle network according to the foregoing embodiment, Ethernet may be used. The use of Ethernet is not a limiting example, and CAN, CAN-FD (Flexible-Datarate), LIN (Local Interconnect Network), or FlexRay may also be used, or the above may be used in combination.

(2) Although threat information abstractor 3005 is illustrated as a constituent element of monitoring server 30*a* or 30*b* according to the foregoing embodiment, threat information abstractor 3005 may be a constituent element of threat information sharing server 40. This configuration makes it possible to centrally manage the threat information collected at each monitoring server at threat information sharing server 40 and to more accurately grasp the occurrence status of abstracted threat information for each vehicle type or for each vehicle.

(3) Although the attack deployability is indicated by the three levels of "high", "medium", and "low" in the example described according to the foregoing embodiment, how the attack deployability is expressed is not limited to this example. For example, the attack deployability may be expressed simply by the number of vehicle types to which the attack is deployed or by the number of vehicles to which the attack is deployed, or the attack deployability may be expressed by, for example, "large", "medium", and "small".

This configuration makes it possible to grasp the deployability status in further detail and to set the level of attack deployability flexibly in accordance with the policy of individual monitoring servers.

(4) Although the vehicle type suitability is indicated by the three levels of "high", "medium", and "low" in the example described according to the foregoing embodiment, how the vehicle type suitability is expressed is not limited to this example. Furthermore, although the vehicle type suitability is determined based on the matrix of the ease of attack success expressed in three levels and the ease of NW access expressed in three levels, this is not a limiting example. For example, the ease of attack success may be a score calculated from the number of signals different from the signal to be altered included in the signal processing condition of the ECU and the method of obtaining the signal, and the ease of attack success as well may be a score calculated from the number of different networks through which a signal is obtained and the number of networks to be routed from an external connection device. The vehicle type suitability may a score calculated from these two scores or may be a score calculated from three scores including the attack deployability. This configuration makes it possible to express the vehicle type suitability in numerical values in further detail and to set the policy of vehicle type suitability in further detail.

(5) Although threat information is stored in plaintext in the example described according to the foregoing embodiment, threat information may be stored in an encrypted state.

(6) Although meta-information indicating the attribute of the threat information is not particularly indicated within the threat information according to the foregoing embodiment, examples of information that may be included as meta-information indicating the attribute of the threat information include a flag indicating that the threat information is abstracted threat information, a flag indicating that the threat information is observed threat information, or a flag indicating that the threat information is threat information obtained by adapting abstracted threat information to a vehicle type. This configuration makes it easy to, for example, set the priority to the utilization of threat information or to express the relationship between items of threat information, and this configuration is thus effective in the management of threat information. Furthermore, the range of information disclosure may be specified by Traffic Light Protocol (TLP) as meta-information. For example, threat information that includes vehicle type information or an ID specific to a vehicle type may be set as "Red" or "Amber" to limit the parties to which the threat information is disclosed, and the abstracted threat information from which vehicle type information or an ID specific to a vehicle type has been deleted may be set as "GREEN" to allow the threat information to be shared within a community. This configuration makes it possible to determine the range in which the information to be published in accordance with the type of the threat information.

(7) Although no particular processing is performed on an anomalous signal name to be altered when threat information is abstracted according to the foregoing embodiment, the signal name may be converted. In a case in which the signal name is specific to a vehicle type, converting the signal name specific to the vehicle type to a generic signal name makes it hard to identify the vehicle type. Furthermore, the generic signal name may be converted back to the signal name specific to the vehicle type at the time of vehicle type adaptation.

(8) Although risk evaluator 3006 and threat information utilizer 3004 are illustrated as constituent elements of monitoring server 30*a* or 30*b* according to the foregoing embodiment, risk evaluator 3006 and threat information utilizer 3004 may be constituent elements within the vehicle. In this case, threat information may be held in the vehicle as well, and the correspondence to the vehicle state pertaining to the calculation of the risk value may be written into the threat information. This configuration can reduce the processing load in monitoring server 30*a* or 30*b* and is advantageous as it allows for an immediate response in the vehicle.

(9) Although the ease of access to the in-vehicle network is determined based on the number of subnetworks to be routed to reach the network over which a signal that has caused the threat is communicated from the external connection device in the example described according to the foregoing embodiment, the determination of the ease of access is not limited to being made by the number of such subnetworks. For example, the ease of reaching such a network may be determined based on the presence or absence of a communication packet filter in a gateway, the presence or absence of authentication in the network access, or the presence or absence of message authentication. This configuration makes it possible to evaluate the possibility that an attacker accesses the network more accurately.

(10) Although the ease of attack success is determined based on the number of conditions for processing a signal held when an ECU has received a signal to be altered or whether there is a condition other than the condition concerning a received signal in the example described according to the foregoing embodiment, the elements for making such a determination are not limited thereto. For example, the ease of attack success may be determined based, for example, on the presence or absence of a measure such as whether an alteration protection measure is taken by a message authentication code on a signal to be altered or a signal that serves as an operation condition for processing the signal to be altered or whether the transmitter of the signal is being authenticated. This configuration makes it possible to more accurately grasp the complexity of the condition under which an attacker can succeed in an attack.

(11) Although the risk value is evaluated for each vehicle in accordance with the vehicle state pertaining to the processing of the signal to be altered included in the threat information in the example described according to the foregoing embodiment, the information to be used to evaluate the risk of the vehicle is not limited thereto. For example, the risk value may be determined in combination with a security alert detected by the vehicle. A security alert may include a result of network intrusion detection and a result of host intrusion detection. Alternatively, a security alert may include the known vulnerability information of the ECU on the attack route to inject the signal to be altered included in the threat information or the number of observed threats. Furthermore, a security alert may include the tendency of the vehicle state of the vehicle. For example, a security alert may include the distribution of the frequency of use of the drive assist function within a predetermined period or the rate of match between the distribution of the traveling speeds and the vehicle state pertaining to the processing of the signal to be altered included in the threat information. This configuration makes it possible to determine the risk value based on the intrusion status of an individual vehicle, the number of vulnerabilities that the attacker can exploit in the vehicle type, or the possibility that the vehicle enters a high-risk vehicle state, and thus the accuracy of risk evaluation increases.

(12) Although no format or communication protocol is set of threat information according to the foregoing embodiment, threat information may be, for example, in a Structured Threat Information expression (STIX) format, and the sharing protocol may be the Trusted Automated exchange of Indicator Information (TAXII). This configuration makes it possible to share the threat information in a standardized method and is thus efficient. Herein, the format or the communication protocol of the threat information is not limited to the above.

(13) Although anomaly detector 1102 is illustrated as a constituent element of in-vehicle network monitoring ECU 110*a* according to the foregoing embodiment, anomaly detector 1102 may be a constituent element of monitoring server 30*a* or 30*b*. This configuration makes it possible to execute an anomaly detection algorithm using resources in monitoring server 30*a* or 30*b* and to detect an anomaly from a vehicle communication log.

(14) Although the communication network of the signal that is to be altered and that serves as an operation condition is described as only the network over which such a signal is communicated according to the foregoing embodiment, there may be a case in which, among the networks over which such a signal is communicated, a network over which the signal is received directly by the ECU differs from a network over which the transmitting ECU transmits the signal. In this case, for the network over which a signal is communicated, the ease of network access may be determined of the network to which the attacker can access easily (high ease of access), and the network with the lowest ease of network access among the plurality of signals may be set as the final ease of network access. This configuration makes it possible to determine the ease of network access based on the network access critical in successfully attacking the network.

(15) Each device (system) according to the foregoing embodiment is, specifically, a computer system that includes, for example, a microprocessor, a ROM, a RAM, a hard disk unit, a display unit, a keyboard, and a mouse. The RAM or the hard disk unit has a computer program recorded thereon. The microprocessor operates in accordance with the computer program, and thus each device implements its function. In this example, the computer program includes a plurality of sets of command codes providing instructions to a computer to implement a predetermined function.

(16) A part or the whole of the constituent elements included in each device according to the foregoing embodiment may be implemented by a single system large scale integration (LSI) circuit. A system LSI circuit is an ultra-multifunctional LSI circuit manufactured by integrating a plurality of components on a single chip and is, specifically, a computer system that includes, for example, a microprocessor, a ROM, and a RAM. The RAM has a computer program recorded thereon. The microprocessor operates in accordance with the computer program, and thus the system LSI implements its function.

Each unit of the constituent elements constituting each device described above may be implemented individually by a single chip, or a part or the whole of such units may be implemented by a single chip.

Although the term "system LSI circuit" is used herein, depending on the difference in the degree of integration, such a circuit may also be called an IC, an LSI circuit, a super LSI circuit, or an ultra LSI circuit. Furthermore, the technique for circuit integration is not limited to LSI, and such a circuit may be implemented by a dedicated circuit or a general purpose processor. A field programmable gate array (FPGA) that can be programmed after an LSI circuit is manufactured or a reconfigurable processor in which the connection or the setting of the circuit cells within the LSI circuit can be reconfigured may also be used.

Furthermore, when a technique for circuit integration that replaces LSI appears through the advancement in the semiconductor technology or through a derived different technique, the functional blocks may be integrated with the use of such different techniques. An application of biotechnology, for example, is a possibility.

(17) A part or the whole of the constituent elements constituting each device described above may be implemented by an IC card or a single module that can be attached to or detached from the device. The IC card or the module is a computer system that includes, for example, a microprocessor, a ROM, and a RAM. The IC card or the module may include the ultra-multifunctional LSI circuit described above. The microprocessor operates in accordance with the computer program, and thus the IC card or the module implements its function. The IC card or the module may be tamper resistant.

(18) The present disclosure can be implemented not only in the form of a threat information deploying system but also in the form of a threat information deploying method that includes the steps (the processes) performed by the constituent elements of the threat information deploying system.

The threat information deploying method is a method to be executed by a threat information deploying system in an in-vehicle control network system, and the threat information deploying method includes, as shown in FIG. 13, obtaining first threat information pertaining to a threat that has occurred in a vehicle of a first vehicle type (step S101), generating abstracted threat information by deleting information specific to the first vehicle type from the first threat information (step S102), and outputting second threat information generated based on the abstracted threat information and including a risk value indicating the risk level of the threat to a second vehicle type different from the first vehicle type (step S107).

In addition, the present disclosure may be implemented by a computer program that causes a computer to execute the threat information deploying method, or may be digital signals composed of such a computer program. For example, one aspect of the present disclosure may be a computer program that causes a computer to execute each characteristic step included in the threat information deploying method indicated in any one of FIG. 14, FIG. 15, and FIG. 17.

In addition, the present disclosure may be implemented in the form of a computer readable recording medium having the computer program or the digital signal recorded thereon, and examples of such a computer readable recording medium include a flexible disk, a hard disk, a CD-ROM, an MO, a DVD, a DVD-ROM, a DVD-RAM, a Blue-ray (BD) (registered trademark) disc, and a semiconductor memory. Moreover, the present disclosure may be implemented by the digital signal recorded on any of the aforementioned recording media.

Furthermore, according to the present disclosure, the computer program or the digital signal may be transmitted via, for example, an electric communication circuit, a wireless or wired communication circuit, a network represented by the internet, or data broadcast.

Furthermore, the present disclosure may provide a computer system that includes a microprocessor and a memory. Then, the memory may have the computer program described above recorded thereon, and the microprocessor may operate in accordance with the computer program.

Furthermore, the present disclosure may be implemented as the program or the digital signal recorded on a recording medium is transported, or as the program or the digital signal is transported via, for example, a network. Thus, the program or the digital signal may be executed by a separate stand-alone computer system.

(19) The orders in which the steps included in the flowcharts according to the foregoing embodiment are executed are merely examples that illustrate the present disclosure in concrete terms, and such orders may differ from the orders illustrated above. One or more of the steps described above may be executed simultaneously (in parallel) with other steps, or one or more of the steps described above may not be executed.

How the functional blocks are divided in the block diagrams illustrated according to the foregoing embodiment is merely an example, and a plurality of functional blocks may be implemented as a single functional block, a single functional block may be divided into a plurality of functional blocks, or one or more functions may be moved to another functional block. The functions of a plurality of functional blocks having similar functions may be processed in parallel or through time division by a single piece of hardware or software.

(20) Although the vehicle control network system is an automobile cybersecurity monitoring system in the example described according to the foregoing embodiment, this is not a limiting example, and the vehicle control network system may be, for example but is not limited to, an in-home network system, an in-facility (e.g., in-hospital) network system, or an in-factory network system.

(21) The foregoing embodiment and the foregoing variations may be combined therebetween.

INDUSTRIAL APPLICABILITY

The present disclosure is effective in, for example but not limited to, a communication log aggregation device in a control network system, such as an in-vehicle network system.

The invention claimed is:

1. A threat information deploying system in an in-vehicle control network system, the threat information deploying system comprising:
 an obtainer that obtains first threat information pertaining to a threat that has occurred in a vehicle of a first vehicle type;
 a threat information abstractor that generates abstracted threat information by deleting information specific to the first vehicle type from the first threat information; and
 an outputter that outputs second threat information generated based on the abstracted threat information and including a risk value indicating a risk level of the threat to a second vehicle type different from the first vehicle type.

2. The threat information deploying system according to claim 1, further comprising:
 a risk value calculator that calculates the risk value.

3. The threat information deploying system according to claim 2, further comprising:
 a threat occurrence status holder; and
 an attack deployability determiner, wherein the threat occurrence status holder holds a threat occurrence status of each anomalous vehicle in which the threat corresponding to the abstracted threat information has been observed,
the attack deployability determiner calculates deployability of the threat corresponding to the abstracted threat information, based on a total number of vehicle types of the anomalous vehicles or a total number of the anomalous vehicles indicated by the threat occurrence status, and
the risk value calculator calculates the risk value based on the deployability.

4. The threat information deploying system according to claim 2, further comprising:
 a vehicle type-specific information holder; and
 a vehicle type suitability determiner, wherein
 the vehicle type-specific information holder holds, for each vehicle type, vehicle type-specific information including at least one of information pertaining to an electronic control device provided, a signal that the electronic control device receives, a network over which the signal that the electronic control device receives is communicated, and configuration information of an in-vehicle network,
 the vehicle type suitability determiner calculates suitability of the abstracted threat information to the second vehicle type with use of the abstracted threat information and the vehicle type-specific information pertaining to the second vehicle type, and
 the risk value calculator calculates the risk value based on the suitability.

5. The threat information deploying system according to claim 4, wherein
 the information pertaining to the electronic control device includes an operation condition for processing a signal received by the electronic control device, and
 the vehicle type suitability determiner calculates the suitability with use of ease of an attack succeeding on the second vehicle type, the ease being determined based on at least one of whether the operation condition for processing the signal that has caused the threat corresponding to the abstracted threat information includes a condition pertaining to a signal outside the in-vehicle network of a vehicle of the second vehicle type, whether there are a predetermined number or more of operation conditions each being the operation condition, or whether an anti-tamper measure or access control is set on the signal that the electronic control device receives.

6. The threat information deploying system according to claim 4, wherein
 the vehicle type suitability determiner calculates the suitability with use of ease of access to a communication network in a vehicle of the second vehicle type, the ease of access being determined based on a total number of subnetworks routed from, among electronic control devices provided in a vehicle of the second vehicle type, an external connection device connected to a network outside the vehicle to the communication network over which the signal that has caused the threat corresponding to the abstracted threat information is communicated.

7. The threat information deploying system according to claim 4, wherein
 the outputter outputs the second threat information when the suitability is greater than or equal to a predetermined value.

8. The threat information deploying system according to claim 2, further comprising:
- a vehicle type-specific information holder; and
- a vehicle log collector, wherein
- the vehicle type-specific information holder holds, for each vehicle type, information pertaining to an electronic control device provided, the information including an operation condition for processing a signal received by the electronic control device,
- the vehicle log collector collects a vehicle log of a vehicle of the second vehicle type, and
- the risk value calculator calculates the risk value with regard to the vehicle based on a degree of match between the operation condition for processing the signal that has caused the threat corresponding to the abstracted threat information and a state of the vehicle included in the vehicle log.

9. The threat information deploying system according to claim 1, further comprising:
- a risk handler, wherein
- the risk handler determines a response to the threat to the second vehicle type based on the risk value, and
- the response is at least one of performing a process of matching an anomalous communication pattern indicated by the second threat information and a communication log collected from the vehicle of the second vehicle type, updating firmware of the electronic control device provided in the vehicle, limiting a function of the vehicle, or sending an alert to a security analyst.

10. A threat information deploying method to be executed by a threat information deploying system in an in-vehicle control network system, the threat information deploying method comprising:
- obtaining first threat information pertaining to a threat that has occurred in a vehicle of a first vehicle type;
- generating abstracted threat information by deleting information specific to the first vehicle type from the first threat information; and
- outputting second threat information generated based on the abstracted threat information and including a risk value indicating a risk level of the threat to a second vehicle type different from the first vehicle type.

11. A non-transitory computer-readable recording medium having recorded thereon a program for causing a threat information deploying system to execute the threat information deploying method according to claim 10.

* * * * *